US009933091B2

(12) United States Patent
Tanaka

(10) Patent No.: US 9,933,091 B2
(45) Date of Patent: Apr. 3, 2018

(54) PENETRATION STRUCTURE FOR FIREPROOF COMPARTMENT CONTAINING EPOXY-RESIN-CONTAINING THERMALLY EXPANDABLE RESIN COMPOSITION SHEET AND METHOD FOR CONSTRUCTING THE PENETRATION STRUCTURE

(71) Applicant: SEKISUI CHEMICAL CO., LTD., Osaka (JP)

(72) Inventor: Takanari Tanaka, Hasuda (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 15/479,509

(22) Filed: Apr. 5, 2017

(65) Prior Publication Data

US 2017/0205000 A1 Jul. 20, 2017

Related U.S. Application Data

(63) Continuation of application No. 14/386,070, filed as application No. PCT/JP2013/002205 on Mar. 30, 2013, now abandoned.

(30) Foreign Application Priority Data

Mar. 30, 2012 (JP) ................................ 2012-083321

(51) Int. Cl.
*F16L 5/04* (2006.01)
*A62C 2/06* (2006.01)
(Continued)

(52) U.S. Cl.
CPC ................ *F16L 5/04* (2013.01); *A62C 2/065* (2013.01); *B32B 3/30* (2013.01); *B32B 27/08* (2013.01);
(Continued)

(58) Field of Classification Search
CPC ....... F16L 5/04; F16L 59/121; F16L 55/1026; A62C 2/06; A62C 2/065; A62C 3/16;
(Continued)

(56) References Cited

U.S. PATENT DOCUMENTS 4,663,204 A 5/1987 Langham

FOREIGN PATENT DOCUMENTS

JP 62-211437 A 9/1987
JP 8-120803 A 5/1996
(Continued)

OTHER PUBLICATIONS

Translation of JP2002-167885 A; published Jun. 11, 2002.*
(Continued)

*Primary Examiner* — Catherine A Simone
(74) *Attorney, Agent, or Firm* — Sughrue Mion, PLLC

(57) ABSTRACT

A penetration structure for a fireproof compartment has a through hole(s) provided at a compartment and a pipe(s) penetrating through the through hole(s). A circumference of the pipe(s) is wound by an epoxy resin-containing thermally expandable resin composition sheet. The epoxy resin-containing thermally expandable resin composition sheet is a laminate of one or more epoxy resin-containing thermally expandable resin composition layers having at least one of linear grooves continuously formed and linear grooves intermittently formed, and two or more of the respective linear grooves being formed onto at least one surface of the epoxy resin-containing thermally expandable resin composition sheet with an interval, and one or more substrate layers. The epoxy-resin-containing thermally expandable resin composition sheet can be wound around the pipe by bending the sheet through use of the grooves even when the temperature is low.

9 Claims, 33 Drawing Sheets

(51) Int. Cl.
  *E04B 1/94* (2006.01)
  *B32B 3/30* (2006.01)
  *B32B 27/08* (2006.01)
  *B32B 27/20* (2006.01)
  *B32B 27/38* (2006.01)
  *B32B 37/14* (2006.01)

(52) U.S. Cl.
  CPC .............. *B32B 27/20* (2013.01); *B32B 27/38* (2013.01); *B32B 37/14* (2013.01); *E04B 1/948* (2013.01); *B32B 2250/02* (2013.01); *B32B 2262/10* (2013.01); *B32B 2307/3065* (2013.01)

(58) Field of Classification Search
  CPC ... B32B 3/30; B32B 27/38; E04B 1/94; E04B 1/948; H02G 3/0412
  See application file for complete search history.

(56) References Cited

FOREIGN PATENT DOCUMENTS

| | | | | |
|---|---|---|---|---|
| JP | 11-131631 A | 5/1999 | | |
| JP | 2001-227083 A | 8/2001 | | |
| JP | 2001-303694 A | 10/2001 | | |
| JP | 2002-167885 A | 6/2002 | | |
| JP | 2006-83598 A | 3/2006 | | |
| JP | 2006176987 A | * | 7/2006 | ................ F16L 5/04 |
| JP | 2011-99258 A | 5/2011 | | |

OTHER PUBLICATIONS

Translation of JP2006-176987 A; published Jul. 6, 2006.*
Notification of Reasons for Refusal dated Nov. 28, 2016 from the Japanese Patent Office issued in corresponding Japanese Application No. 2013-535983.
Communication dated Nov. 9, 2015, issued by the Australian Patent Office in Australian Application No. 2013238599.
Communication dated Oct. 6, 2015 from the European Patent Office issued in corresponding European application No. 13770316.1.
International Search Report for PCT/JP2013/002205 dated Jul. 2, 2013.
Translation of JP 2000-143941, published May 26, 2000.
Translation of JP 2001-303694, published Oct. 31, 2001.

* cited by examiner

PENETRATION STRUCTURE FOR FIREPROOF COMPARTMENT CONTAINING EPOXY-RESIN-CONTAINING THERMALLY EXPANDABLE RESIN COMPOSITION SHEET AND METHOD FOR CONSTRUCTING THE PENETRATION STRUCTURE

CROSS REFERENCE TO RELATED APPLICATIONS

This application is a Continuation Application of U.S. application Ser. No. 14/386,070 filed Sep. 18, 2014, which is a National Stage of International Application No. PCT/JP2013/002205 filed Mar. 30, 2013, claiming priority based on Japanese Patent Application No. 2012-083321 filed Mar. 30, 2012, the contents of all of which are incorporated herein by reference in their entirety.

TECHNICAL FIELD

The present invention relates to an epoxy resin-containing thermally expandable resin composition sheet and a method for constructing a penetration structure for a fireproof compartment using the epoxy resin-containing thermally expandable resin composition sheet.

BACKGROUND ART

Even when a fire is generated at a part of a partitioned portion of a structure such as a building, etc., a compartment has generally been provided at a partitioned portion of a building, etc., to prevent from spreading a flame or smoke, etc., to the other portion.

When pipes are to be provided at the inside of the building, it is necessary to make holes penetrating through the compartment, and the pipe(s) is/are penetrated through the through hole(s).

However, among the existent structure such as a building, etc., there exists a structure in which pipes are directly penetrated through the compartment without providing any suitable fireproof measures. When any suitable fireproof measures are not applied to the pipe(s) penetrating through the compartment, if a fire, etc., is generated, there causes the problem that a flame or smoke, etc., is diffused from one side of the compartment to the other sides passing through the through hole.

To address this problem, it has been proposed a fireproof device called a collar to be used for the structure in which pipes are directly penetrated through the compartment. The collar is made of a metal, and used by mounting onto the pipe(s).

FIG. 30 is a schematic perspective view for explaining a conventional fireproof device.

The fireproof device illustrated in FIG. 30 is a material called a collar 500, and constituted by a platy metal unit 510 by bending to a circular shape. By bending the metal unit 510 of the collar 500, the circular collar 500 is capable of ring opening or ring closing. Therefore, after ring opening the collar 500, it is wounded to the outer periphery of the pipe(s) penetrating through the compartment, thereafter, the collar 500 can be ring closed.

Also, a clasp 520 and a receiver 530 of the clasp are provided at the collar 500, and it has a structure that can retain the ring-closed state after winding the collar 500 to the outer periphery of the pipe(s).

In addition, a thermally expandable resin composition 600 is filled at the inside of each metal unit 510.

Further, the collar 500 has a compartment fixing portion 540, and the collar 500 can be fixed to the compartment by the compartment fixing portion 540.

FIG. 31 and FIG. 32 are schematic views for explaining a conventional penetration structure for a fireproof compartment using a collar.

As illustrated in FIG. 31 and FIG. 32, the collar 500 is wounded to the outer periphery of the pipe 30, and a compartment fixing portion 540 of the collar 500 is fixed to a compartment 40 by an anchor bolt 501. An inner diameter of the collar 500 is substantially matching with an outer diameter of the pipe 30, so that the collar 500 is provided to the pipe 30 without a gap.

When the conventional penetration structures for a fireproof compartment shown in FIG. 31 and FIG. 32 are exposed to heat of fire, etc., even when the pipe 30 are deformed or destroyed by fire, a thermally expandable resin composition 600 at the inside of the metal unit 510 constituting the collar 500 is expanded to block the through hole provided at the compartment.

According to the above, even when a fire is generated at one side of the compartment, it can be checked the spread of the fire to the compartment of the other side, or can be prevented from diffusion of smoke or a poisonous gas, etc.

However, the collar 500 having the structure as illustrated in FIG. 30 has a constant inner diameter of the collar 500, so that there is a problem that various kinds of collars 500 that match the respective pipes must be prepared when plural kinds of pipes having different sizes are present.

In addition, there are problems that it is difficult to handle the collar 500 since it has a large volume as well as it is heavy since it is made of a metal.

To solve the above problems, a collar having a structure in which it can be used to the collar 500 shown in FIG. 30 by cutting the metal unit to an optional length has been proposed. It is to be excellent in handling property since it is possible to freely change the inner diameter of the collar by adjusting the length of the metal unit of the collar matching the size of the pipes (Patent Documents 1 and 2).

If the collar has a structure which can be cut to any optional length, an inner diameter can be adjusted depending on the kind of the pipes, so that the problem that various kinds of collars 500 must be prepared can be solved.

However, when a collar having such a structure that the metal unit can be cut to any optional length is used, it is required to prepare a special cutting tool for cutting the collar.

In addition, while the collar is capable of dividing, it has a relatively heavy weight and a volume of the collar is not changed to be large, so that there is a problem that handling thereof is not easy.

On the other hand, it has also been proposed a pipe collar using no metal unit (Patent Document 3).

FIG. 33 is a schematic perspective view for explaining a structure of the conventional pipe collar.

As illustrated in FIG. 33, a pipe collar 610 has a long aluminum foil 620, and rectangular parallelepiped blocks 630 consisting of a thermally expandable refractory material and provided at the inside of the aluminum foil with regularly spaced.

The pipe collar 610 is formed by the aluminum foil 620 and the blocks 630, which requires no metal member, so that the weight of the pipe collar 610 can be lightened.

However, there are problems that the aluminum foil 620 is easily broken when the pipe collar 610 is transported, and the blocks 630 are damaged or deformed in some cases when the pipe collar 610 is transported, so that handling of the pipe collar 610 is difficult.

Moreover, it has been proposed a sheet state material formed by a thermally expandable resin composition containing an epoxy resin, a phosphorus compound, thermally expandable graphite subjected to neutralization treatment and an inorganic filler (Patent Document 4).

In this prior art, it has been disclosed that the epoxy resin contained in the sheet state material is cured by heating whereby it can be used as a penetration structure for a fireproof compartment.

PRIOR ART DOCUMENTS

Patent Documents

Patent Document 1: EP 1273841A
Patent Document 2: PCT/AU00/00407
Patent Document 3: DE 10138726A
Patent Document 4: JP 2001-303692A

SUMMARY OF THE INVENTION

However, the epoxy resin contained in the sheet state material using the thermally expandable resin composition containing the epoxy resin has been cured inside the sheet state material, so that it was poor in flexibility and was difficulty bent.

When the present inventor has studied, he has found the problem that a sheet state material using a thermally expandable resin composition which contains an epoxy resin can be difficulty wound to the circumference of pipe(s), and in particular, under the environment with a low temperature such as winter, etc., it becomes more difficult to wind the sheet state material using the thermally expandable resin composition which contains the epoxy resin to the circumference of the pipe(s).

An object of the present invention is to provide an epoxy resin-containing thermally expandable resin composition sheet which can be handled easily and can be provided to the circumference of the pipe(s) even when the temperature is low.

Means to Solve the Problems

To solve the above-mentioned problems, the present inventor has earnestly investigated, and as a result, he has found out that an epoxy resin-containing thermally expandable resin composition sheet having a plural number of linear grooves at the surface of matches the purpose of the present invention, whereby the present invention has been accomplished.

That is, the present invention is to provide [1] an epoxy resin-containing thermally expandable resin composition sheet which comprises an epoxy resin-containing thermally expandable resin composition layer(s) having at least one of linear grooves continuously formed and linear grooves intermittently formed, and two or more of the respective linear grooves being formed onto at least one surface of the epoxy resin-containing thermally expandable resin composition sheet with an interval, and
   a substrate layer(s),
   being laminated.

Also, one of the present inventions is to provide [2] the epoxy resin-containing thermally expandable resin composition sheet described in the [1], wherein the linear grooves penetrate at least one of the substrate layers, and reach to the epoxy resin-containing thermally expandable resin composition layer(s).

Further, one of the present inventions is to provide [3] the epoxy resin-containing thermally expandable resin composition sheet described in the [1] or [2], wherein the two or more respective linear grooves formed onto at least one surface of the epoxy resin-containing thermally expandable resin composition sheet are formed substantially parallel from each other.

Moreover, one of the present inventions is to provide [4] the epoxy resin-containing thermally expandable resin composition sheet described in any one of the [1] to [3], wherein the two or more respective linear grooves formed onto at least one surface of the epoxy resin-containing thermally expandable resin composition sheet are formed substantially perpendicular to the longitudinal direction of the epoxy resin-containing thermally expandable resin composition sheet, with an interval from each other.

Furthermore, one of the present inventions is to provide [5] the epoxy resin-containing thermally expandable resin composition sheet described in any one of the [1] to [4], wherein the two or more respective linear grooves formed onto at least one surface of the epoxy resin-containing thermally expandable resin composition sheet are formed obliquely to the longitudinal direction of the epoxy resin-containing thermally expandable resin composition sheet, with an interval from each other.

Also, one of the present inventions is to provide [6] the epoxy resin-containing thermally expandable resin composition sheet described in any one of the [1] to [5], wherein linear grooves intersecting with the two or more respective linear grooves formed onto at least one surface of the epoxy resin-containing thermally expandable resin composition sheet are formed to the longitudinal direction of the epoxy resin-containing thermally expandable resin composition sheet.

Further, one of the present inventions is to provide [7] the epoxy resin-containing thermally expandable resin composition sheet described in any one of the [1] to [6], wherein the linear grooves are formed by pressing a projected material to the epoxy resin-containing thermally expandable resin composition sheet before curing the epoxy resin contained in the epoxy resin-containing thermally expandable resin composition sheet.

Moreover, one of the present inventions is to provide [8] the epoxy resin-containing thermally expandable resin composition sheet described in any one of the [1] to [7], wherein the linear grooves are formed by cutting the epoxy resin-containing thermally expandable resin composition sheet after curing the epoxy resin contained in the epoxy resin-containing thermally expandable resin composition sheet.

Furthermore, the present invention is to provide [9] the epoxy resin-containing thermally expandable resin composition sheet described in any one of the [1] to [8], wherein the epoxy resin-containing thermally expandable resin composition layer contains at least an epoxy resin, a thermally expandable graphite and an inorganic filler.

Also, one of the present inventions is to provide [10] the epoxy resin-containing thermally expandable resin composition sheet described in any one of the [1] to [9], wherein the substrate layer contains at least one selected from the group consisting of paper, cloth, a synthetic resin, a metal foil and inorganic fiber.

Further, one of the present inventions is to provide [11] the epoxy resin-containing thermally expandable resin composition sheet described in any one of the [1] to [10], wherein a thickness of the epoxy resin-containing thermally expandable resin composition layer is in the range of 0.3 to 4 mm.

Moreover, the present invention is to provide [12] a method for constructing a penetration structure for a fireproof compartment which comprises at least
(1) a step of winding the epoxy resin-containing thermally expandable resin composition sheet described in any one of the [1] to [11] to a pipe(s) penetrating through a through hole(s) provided at the compartment, and
(2) a step of filling a gap between the pipe(s) wound by the epoxy resin-containing thermally expandable resin composition sheet and the through hole(s) provided at the compartment by an incombustible material.

Furthermore, one of the present inventions is to provide [13] the method for constructing a penetration structure for a fireproof compartment described in the [12], wherein the step (1) is
a step of bending the epoxy resin-containing thermally expandable resin composition layer of the epoxy resin-containing thermally expandable resin composition sheet described in any one of the [1] to [11] to the direction in which the continuously formed linear grooves close, and winding the epoxy resin-containing thermally expandable resin composition sheet to the pipe(s) penetrating through the through hole(s) provided to the compartment by facing the linear grooves toward the pipe(s) side.

Also, one of the present inventions is to provide [14] the method for constructing a penetration structure for a fireproof compartment described in the [12], which is a step of bending the epoxy resin-containing thermally expandable resin composition layer of the epoxy resin-containing thermally expandable resin composition sheet described in any one of the [1] to [11] to the direction in which the continuously or intermittently formed linear grooves open, and winding the epoxy resin-containing thermally expandable resin composition sheet to the pipe(s) penetrating through the through hole(s) provided to the compartment by facing the linear grooves toward the outside.

Further, one of the present inventions is to provide [15] the method for constructing a penetration structure for a fireproof compartment described in any one of the [12] to [14], which comprises (3) a step of bending the epoxy resin-containing thermally expandable resin composition layer of the epoxy resin-containing thermally expandable resin composition sheet described in any one of the [1] to [11] to the direction in which the linear grooves open, and cracking the same along with the linear grooves.

Moreover, one of the present inventions is to provide [16] the method for constructing a penetration structure for a fireproof compartment described in any one of the [12] to [15], which comprises (4) a step of winding a base tape to the epoxy resin-containing thermally expandable resin composition sheet.

Furthermore, one of the present inventions is to provide [17] the method for constructing a penetration structure for a fireproof compartment described in any one of the [12] to [16], wherein the compartment used in the step (2) is a hollow wall, and
at least one substrate layer laminated at the outside of the epoxy resin-containing thermally expandable resin composition layer contained in the epoxy resin-containing thermally expandable resin composition sheet contains an incombustible material.

Also, one of the present inventions is to provide [18] the method for constructing a penetration structure for a fireproof compartment described in any one of the [12] to [17], which comprises a step of winding a round or more the epoxy resin-containing thermally expandable resin composition sheet in which two or more respective linear grooves formed onto at least one surface of the epoxy resin-containing thermally expandable resin composition sheet are formed substantially perpendicular to the longitudinal direction of the epoxy resin-containing thermally expandable resin composition sheet with an interval from each other, in the substantially perpendicular direction to the longitudinal direction of the pipe(s).

Further, one of the present inventions is to provide [19] the method for constructing a penetration structure for a fireproof compartment described in any one of the [12] to [18], which comprises a step of winding spirally the epoxy resin-containing thermally expandable resin composition sheet in which two or more respective linear grooves formed onto at least one surface of the epoxy resin-containing thermally expandable resin composition sheet are formed obliquely to the longitudinal direction of the epoxy resin-containing thermally expandable resin composition sheet with an interval from each other, to the longitudinal direction of the pipe(s).

Effects of the Invention

As compared with the fireproof device called as the conventional collar, the epoxy resin-containing thermally expandable resin composition sheet of the present invention does not necessary to prepare various kinds of materials which are matching with shapes of the constructed pipe(s).

Also, when the epoxy resin-containing thermally expandable resin composition sheet of the present invention is to be used by cutting, it is not required to use any special cutting tool which had been required to use the conventional fireproof device called a collar.

Further, as compared with the fireproof device called as the conventional collar, the epoxy resin-containing thermally expandable resin composition sheet of the present invention has a smaller volume and a lighter weight so that it is excellent in handling property.

In the epoxy resin-containing thermally expandable resin composition sheet of the present invention, linear grooves are formed onto at least one surface thereof. By utilizing the linear grooves, the epoxy resin-containing thermally expandable resin composition sheet can be easily bent to the direction in which the linear grooves open or to the direction in which the linear grooves close.

When an epoxy resin-containing thermally expandable resin composition layer having poor flexibility is used, even when it is under the environment with a low temperature, the epoxy resin-containing thermally expandable resin composition sheet of the present invention can be easily wound to the pipe(s).

Also, when the conventional epoxy resin-containing sheet state material is used, it is difficult to bend the epoxy resin-containing sheet state material, and if it could be bent, there is a case where the epoxy resin-containing sheet state material is broken.

To the contrary, in the epoxy resin-containing thermally expandable resin composition sheet of the present invention, even when the epoxy resin-containing thermally expandable resin composition layer is broken, the broken epoxy resin-containing thermally expandable resin composition layer is retained to the substrate layer, so that the broken pieces are never scattered and the broken epoxy resin-containing thermally expandable resin composition layer can be used as such.

To the contrary, when the epoxy resin-containing thermally expandable resin composition layer is broken, the epoxy resin-containing thermally expandable resin composition sheet can be bent freely, so that the epoxy resin-containing thermally expandable resin composition sheet of the present invention can be easily wound to the circumference of the pipe(s). Therefore, the epoxy resin-containing thermally expandable resin composition sheet of the present invention is excellent in workability.

The epoxy resin-containing thermally expandable resin composition sheet of the present invention can be further freely bent by providing the linear grooves on the both surfaces. It can be wound to the circumference of the pipe(s) even when the outer shapes of the pipe(s) is/are complicated shapes, so that it is excellent in handling property.

Also, the epoxy resin-containing thermally expandable resin composition sheet of the present invention is convenient in portability, and can be handled easily.

Further, the epoxy resin-containing thermally expandable resin composition sheet of the present invention can be used for the use of a penetration structure for a fireproof compartment.

The penetration structure for a fireproof compartment using the epoxy resin-containing thermally expandable resin composition sheet can be obtained by winding the epoxy resin-containing thermally expandable resin composition sheet having the epoxy resin-containing thermally expandable resin composition layer to the circumference of the pipe(s) penetrating through the compartment, so that it can be easily constructed.

Also, the epoxy resin-containing thermally expandable resin composition sheet of the present invention is not only capable of easily winding a round or more in the substantially perpendicular direction to the longitudinal direction of the pipe(s), but also capable of easily winding spirally to the longitudinal direction of the pipe(s).

Since the epoxy resin-containing thermally expandable resin composition sheet of the present invention can be wound to the pipe(s) without depending on the length or outer shape of the pipe(s), the epoxy resin-containing thermally expandable resin composition sheet of the present invention is excellent in workability.

When the penetration structure for a fireproof compartment is exposed to heat of a fire, etc., the epoxy resin-containing thermally expandable resin composition layer contained in the epoxy resin-containing thermally expandable resin composition sheet is expanded to form an incombustible expansion residue. The through hole provided at the compartment is blocked by the expansion residue.

Due to the expansion residue, spreading of a flame, smoke, etc., of a fire, etc., from one side of the compartment to the other side can be prevented.

Also, when at least one of the substrate layers laminated at the outside of the epoxy resin-containing thermally expandable resin composition layer contained in the epoxy resin-containing thermally expandable resin composition sheet contains an incombustible material, and when a base tape consisting of an incombustible material is wound to the outer periphery of the epoxy resin-containing thermally expandable resin composition sheet, the base tape consisting of the incombustible material, etc., remains by retaining the cylindrical shape even if the penetration structure for a fireproof compartment is exposed to heat of a fire, etc.

When the compartment is a hollow wall and a space exists inside the walls, a flame, smoke, etc., of a fire, etc., spreads passing through the space inside of the walls in some cases if a suitable fireproof measure is not applied.

To the contrary, in the case of the penetration structure for a fireproof compartment using the epoxy resin-containing thermally expandable resin composition sheet in which at least one of the substrate layers laminated at the outside of the epoxy resin-containing thermally expandable resin composition layer contains an incombustible material and in the case of the penetration structure for a fireproof compartment in which a base tape is wound to the outer periphery of the epoxy resin-containing thermally expandable resin composition sheet, even when the pipe(s) penetrating through the compartment is melted down or destroyed by heat of a fire, etc., inside of the cylindrical material is blocked by the expansion residue formed by the epoxy resin-containing thermally expandable resin composition layer.

Due to the expansion residue, spreading of a flame, smoke, etc., of a fire, etc., from one side of the compartment to the other side can be prevented.

EMBODIMENTS TO CARRY OUT THE INVENTION

The present invention relates to an epoxy resin-containing thermally expandable resin composition sheet and method for constructing a penetration structure for a fireproof compartment, and the epoxy resin-containing thermally expandable resin composition sheet of the present invention is firstly explained.

Figure 1:
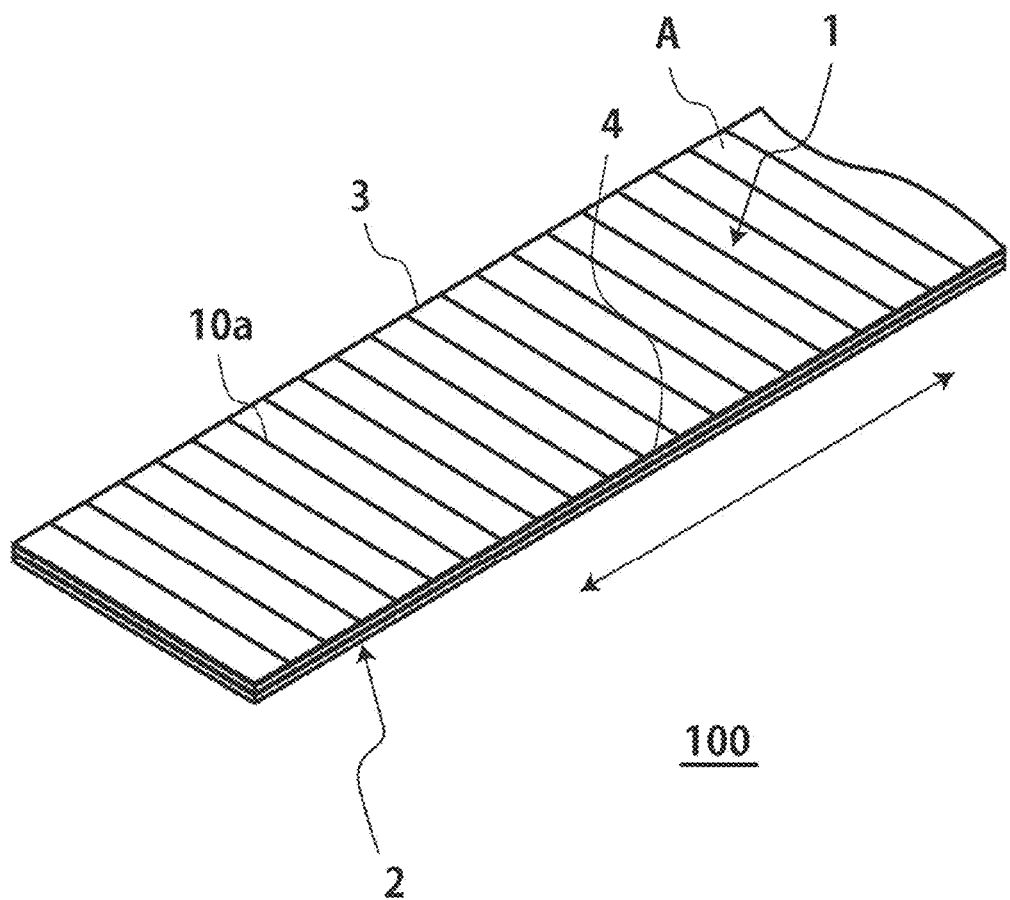
FIG. 1 is a schematic partial perspective view for explaining an epoxy resin-containing thermally expandable resin composition sheet according to the first embodiment of the present invention.

FIG. 1 is a schematic partial perspective view for explaining an epoxy resin-containing thermally expandable resin composition sheet according to the first embodiment of the present invention.

The epoxy resin-containing thermally expandable resin composition sheet 100 according to the first embodiment has an epoxy resin-containing thermally expandable resin composition layer 1 and a substrate layer 2.

Incidentally, the epoxy resin-containing thermally expandable resin composition sheet of the present invention has at least an epoxy resin-containing thermally expandable resin composition layer 1 and a substrate layer 2.

As exemplified in FIG. 1, two or more linear grooves 10a are formed onto one face A of the epoxy resin-containing thermally expandable resin composition sheet 100.

The respective linear grooves 10a are formed onto the epoxy resin-containing thermally expandable resin composition layer 1 with an interval from each other.

In the case of FIG. 1, the respective linear grooves 10a are formed substantially perpendicular to the longitudinal direction (the direction shown by the arrow of FIG. 1) of the epoxy resin-containing thermally expandable resin composition sheet 100. Also, the respective linear grooves 10a are continuous, and reach to both of one side 3 and the other side 4 of the epoxy resin-containing thermally expandable resin composition layer 1.

Incidentally, substantially perpendicular herein mentioned means an angle in the range of exceeding 85° and less than 95° to the longitudinal direction of the epoxy resin-containing thermally expandable resin composition sheet 100.

Figure 2:
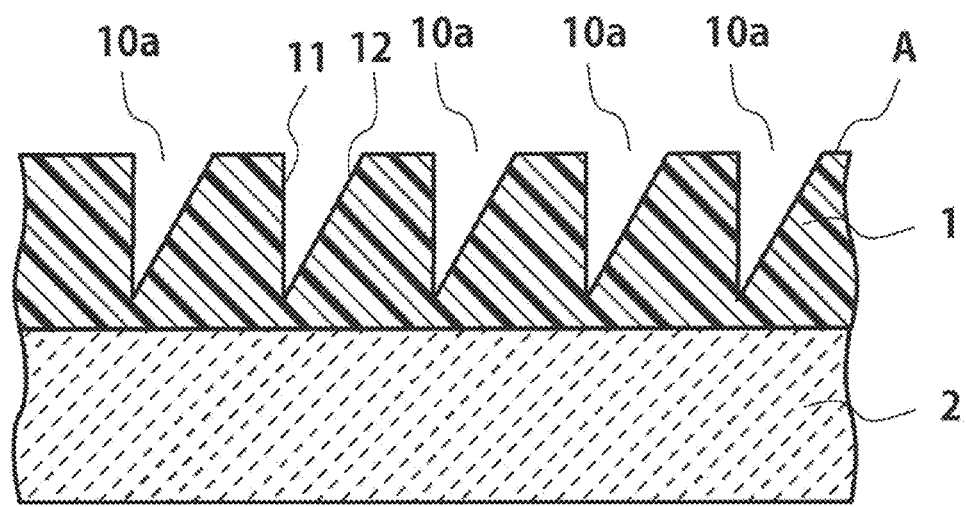
FIG. 2 is a schematic partial sectional view for explaining a shape of the linear grooves formed onto the epoxy resin-containing thermally expandable resin composition layer.

FIG. 2 is a schematic partial sectional view for explaining a shape of the linear grooves formed onto the epoxy resin-containing thermally expandable resin composition layer.

FIG. 2 exemplifies a sectional view of the linear grooves 10a in which the epoxy resin-containing thermally expandable resin composition sheet 100 was cut along with the longitudinal direction of the epoxy resin-containing thermally expandable resin composition sheet 100.

As exemplified in FIG. 2, the cross section of the linear grooves 10a is triangular.

The linear grooves 10a can be formed by providing cuttings onto one face A of the epoxy resin-containing thermally expandable resin composition layer 1.

The sectional face of the linear grooves 10a is formed by a side 11 perpendicular to the face A, and a side 12 which is an angle of 30° to the side 11.

The angle of the side 11 and the side 12 can be optionally selected depending on the outer shape, diameter, etc., of the pipe(s) when the epoxy resin-containing thermally expandable resin composition sheet 100 is wound to the pipe(s) and, for example, is preferably in the range of 1 to 80°, more preferably in the range of 30 to 70°, further preferably in the range of 45 to 60°.

When the angle of the side 11 and the side 12 is in the range of 1 to 70°, the epoxy resin-containing thermally expandable resin composition sheet 100 can be bent freely.

Next, the epoxy resin-containing thermally expandable resin composition sheet 110 according to the second embodiment of the present invention is explained.

Figure 3:
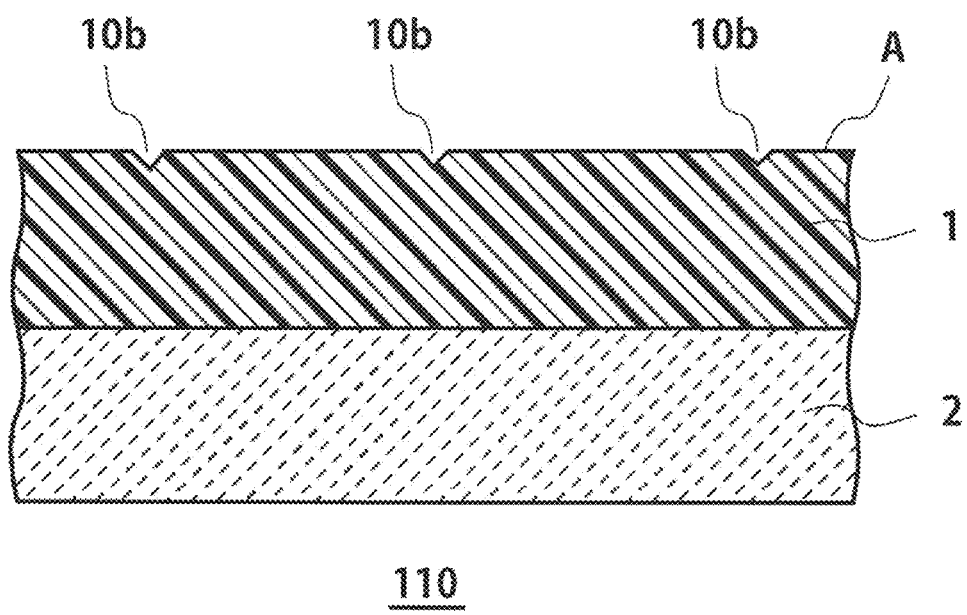
FIG. 3 is a schematic partial sectional view for explaining an epoxy resin-containing thermally expandable resin composition sheet according to the second embodiment of the present invention.

FIG. 3 is a schematic partial sectional view for explaining an epoxy resin-containing thermally expandable resin composition sheet according to the second embodiment of the present invention.

The epoxy resin-containing thermally expandable resin composition sheet 110 according to the second embodiment is different in the shape of the linear grooves 10b as compared from the epoxy resin-containing thermally expandable resin composition sheet 100 according to the first embodiment. Other than the above, it is the same as those of the epoxy resin-containing thermally expandable resin composition sheet 100 according to the first embodiment.

In the case of the epoxy resin-containing thermally expandable resin composition sheet 100 according to the first embodiment explained above, the linear grooves 10a are deep to the epoxy resin-containing thermally expandable resin composition layer 1, while in the case of the epoxy resin-containing thermally expandable resin composition sheet 110 according to the second embodiment, the linear grooves 10b are shallow to the epoxy resin-containing thermally expandable resin composition layer 1.

In FIG. 3, the cross sectional shape of the linear grooves 10b is V-shaped. The linear grooves 10b formed onto one face A of the epoxy resin-containing thermally expandable resin composition layer 1 are sometimes called as a notch, cutting, a scratch, etc.

In the case of the epoxy resin-containing thermally expandable resin composition sheet 110 according to the second embodiment of the present invention, the epoxy resin-containing thermally expandable resin composition layer 1 can be used by cracking it utilizing the linear grooves 10b.

Figure 4:
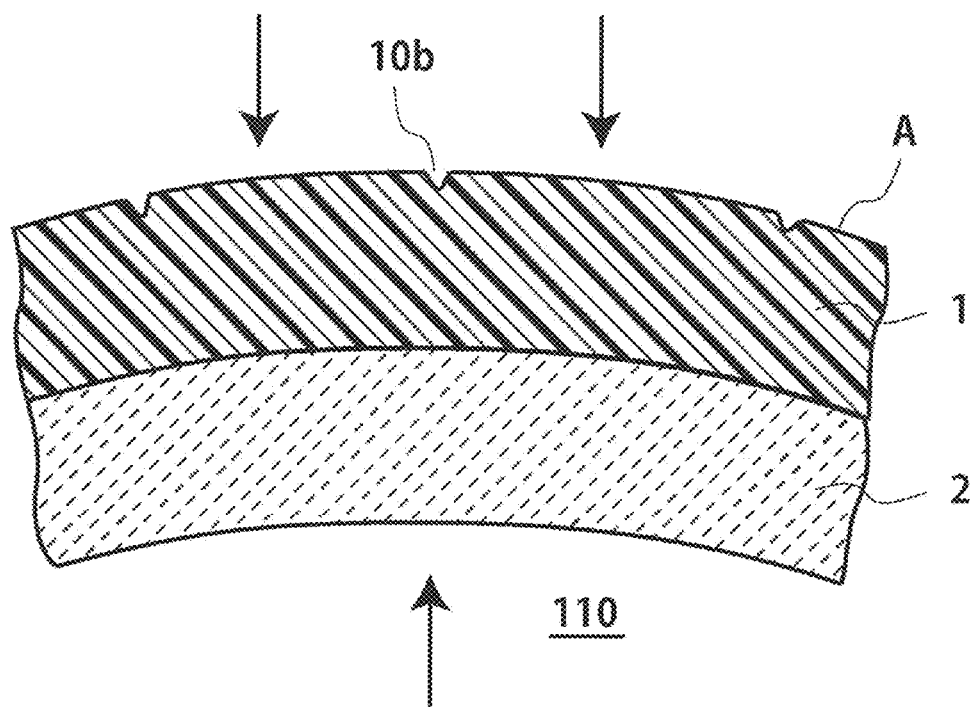
FIG. 4 is a schematic sectional view of a main part for explaining a state in which the epoxy resin-containing thermally expandable resin composition layer has been bent.
Figure 5:
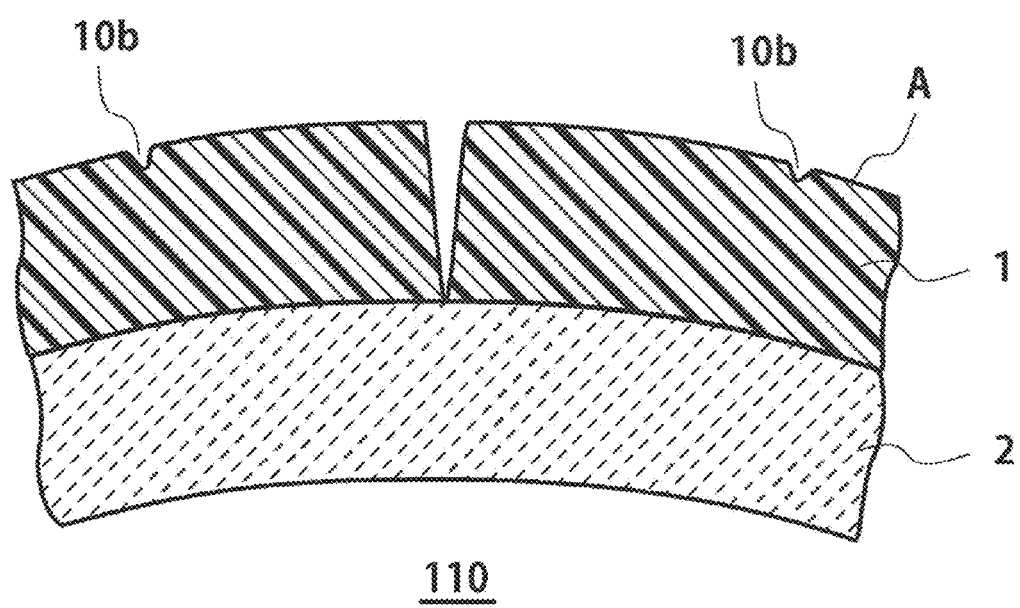
FIG. 5 is a schematic sectional view of a main part for explaining a state in which the epoxy resin-containing thermally expandable resin composition layer has been cracked.

FIG. 4 is a schematic sectional view of a main part for explaining a state in which the epoxy resin-containing thermally expandable resin composition layer has been bent, and FIG. 5 is a schematic sectional view of a main part for explaining a state in which the epoxy resin-containing thermally expandable resin composition layer has been cracked.

As exemplified in FIG. 4, when the epoxy resin-containing thermally expandable resin composition layer 1 contained in the epoxy resin-containing thermally expandable resin composition sheet 110 is bent to the direction in which the linear grooves 10b open, the epoxy resin-containing thermally expandable resin composition layer 1 contained in the epoxy resin-containing thermally expandable resin composition sheet 110 causes brittle fracture as exemplified in FIG. 5.

In FIG. 4, the bending state of the epoxy resin-containing thermally expandable resin composition sheet 110 is emphasized for the convenience sake.

The bending state of the epoxy resin-containing thermally expandable resin composition sheet 110 can be confirmed with naked eyes in some cases, but when the epoxy resin-containing thermally expandable resin composition layer 1 contained in the epoxy resin-containing thermally expandable resin composition sheet 110 is bent to the direction in which the linear grooves 10b open, the epoxy resin-containing thermally expandable resin composition layer 1 causes brittle fracture simultaneously and cracks in many cases.

Incidentally, the cross sectional shape of the linear grooves 10b employed by the present invention is not particularly limited so long as it is a shape in which the epoxy resin-containing thermally expandable resin composition layer 1 causes brittle fracture when a stress is applied to the epoxy resin-containing thermally expandable resin composition layer 1 to the direction where the linear grooves 10b open, and the cross sectional shape may be, for example, a shape of U-shaped, I-shaped, etc., in addition to V-shaped, etc.

Figure 6:
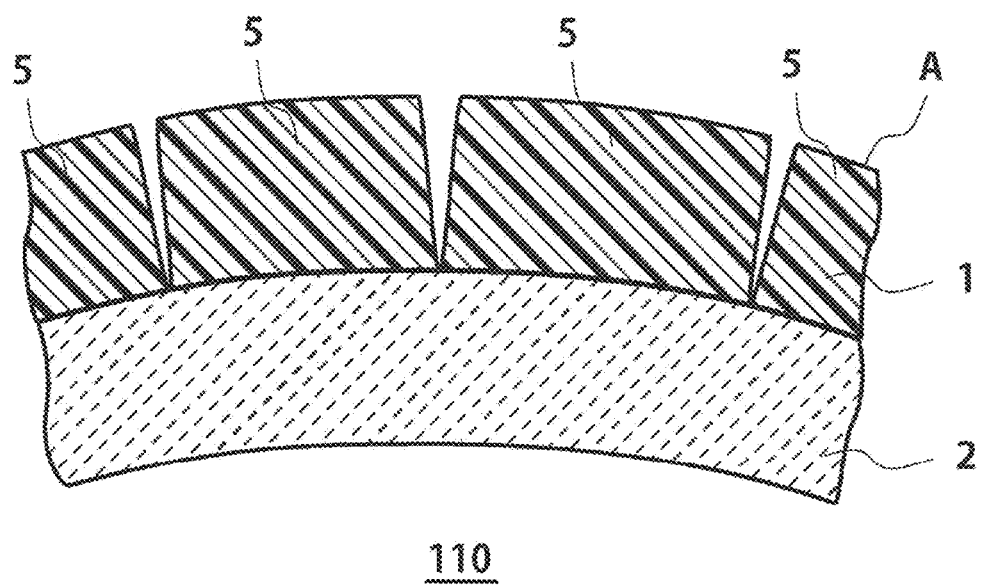
FIG. 6 is a schematic partial sectional view for explaining a plural number of epoxy resin-containing thermally expandable resin composition pieces formed after cracking the epoxy resin-containing thermally expandable resin composition layer.

FIG. 6 is a schematic partial sectional view for explaining a plural number of epoxy resin-containing thermally expandable resin composition pieces formed after cracking the epoxy resin-containing thermally expandable resin composition layer 1.

By cracking the epoxy resin-containing thermally expandable resin composition layer 1 along with the linear grooves 10b, the epoxy resin-containing thermally expandable resin composition layer 1 is divided into a plural number of epoxy resin-containing thermally expandable resin composition pieces 5.

The epoxy resin-containing thermally expandable resin composition pieces 5 are fixed to the substrate layer 2, so that after cracking the epoxy resin-containing thermally expandable resin composition layer 1, the epoxy resin-containing thermally expandable resin composition pieces 5 can be prevented from dropping from the substrate layer 2.

Also, by selecting a soft material as the substrate layer 2, the epoxy resin-containing thermally expandable resin composition sheet 110 can be bent freely.

Next, the epoxy resin-containing thermally expandable resin composition sheet according to the third embodiment of the present invention 120 is explained.

The epoxy resin-containing thermally expandable resin composition sheet 100 according to the first embodiment and the epoxy resin-containing thermally expandable resin composition sheet 110 according to the second embodiment explained above were the two-layer structure of the epoxy resin-containing thermally expandable resin composition layer 1 and the substrate layer 2.

To the contrary, the epoxy resin-containing thermally expandable resin composition sheet 120 according to the third embodiment is different from the above-mentioned epoxy resin-containing thermally expandable resin composition sheet 100 according to the first embodiment and the epoxy resin-containing thermally expandable resin composition sheet 110 according to the second embodiment in the point that the substrate layer 2, the epoxy resin-containing thermally expandable resin composition layer 1 and the substrate layer 6 are the three-layered structure in which they are laminated in the order of the substrate layer 2—the epoxy resin-containing thermally expandable resin composition layer 1—the substrate layer 6, respectively.

Figure 7:
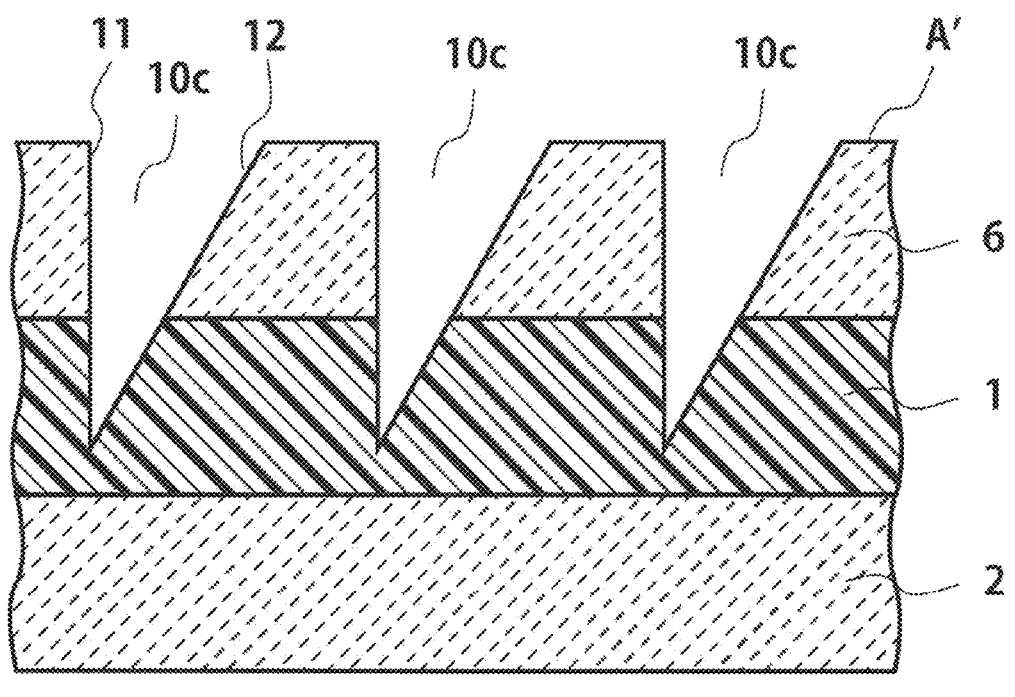
FIG. 7 is a schematic partial sectional view for explaining an epoxy resin-containing thermally expandable resin composition sheet according to the third embodiment of the present invention.

FIG. 7 is a schematic partial sectional view for explaining an epoxy resin-containing thermally expandable resin composition sheet according to the third embodiment of the present invention.

As exemplified in FIG. 7, the substrate layers 2 and 6 are laminated onto both surfaces of the epoxy resin-containing thermally expandable resin composition layer 1.

Also, the linear grooves 10c penetrate the substrate layer 6 laminated onto one face A' of the epoxy resin-containing thermally expandable resin composition sheet 120, and reach to the epoxy resin-containing thermally expandable resin composition layer 1.

By providing cuttings to the substrate layer 6 and epoxy resin-containing thermally expandable resin composition layer 1, the linear grooves 10c can be formed.

A cross section of the linear grooves 10c is formed by triangular sides 11 and 12 to the one face A' of the epoxy resin-containing thermally expandable resin composition sheet 120.

Thicknesses of the respective epoxy resin-containing thermally expandable resin composition layers 1 of the epoxy resin-containing thermally expandable resin composition sheet according to the first embodiment to the epoxy resin-containing thermally expandable resin composition sheet according to the third embodiment are preferably in the range of 0.5 to 4 mm in the viewpoint of handling property.

Depths of the respective linear grooves 10a, 10b and 10c to the epoxy resin-containing thermally expandable resin composition sheet according to the first embodiment to the epoxy resin-containing thermally expandable resin composition sheet according to the third embodiment can be optionally selected depending on the outer shape, diameter, etc., of the pipe(s) when the epoxy resin-containing thermally expandable resin composition sheet is wound to the pipe(s), respectively.

For example, the depth of the linear grooves 10 is preferably in the range of 0.001 t to 0.95 t, more preferably in the range of 0.01 to 0.7 t based on the thickness of the epoxy resin-containing thermally expandable resin composition layer 1 as t and to the perpendicular direction to the face A.

Also, intervals of the linear grooves are preferably in the range of $\frac{1}{5}r$ to $\frac{2}{3}r$ based on a half of the maximum outer diameter of the pipe(s) as r explained later in the point of handling property.

A number of the linear grooves to be formed onto the respective epoxy resin-containing thermally expandable resin composition sheets 100 to 120 are preferably as much as possible since the epoxy resin-containing thermally expandable resin composition sheets 100 to 120 can be bent easily.

Next, a method of forming the linear grooves 10a to 10c is explained.

The method of forming the linear grooves 10a to 10c may be mentioned, for example, a method in which at the time of molding the epoxy resin-containing thermally expandable resin composition sheets 100 to 120, a projected material, for example, a metal mold having a projection is pressed to the epoxy resin-containing thermally expandable resin composition sheets 100 to 120 before completely curing the epoxy resin contained in the epoxy resin-containing thermally expandable resin composition layer 1, etc.

Also, after the epoxy resin contained in the epoxy resin-containing thermally expandable resin composition layer 1 is completely cured, there may be mentioned a method in which the surface of the epoxy resin-containing thermally expandable resin composition sheets 100 to 120 is cut by a blade, etc.

As the method of cutting the surface of the epoxy resin-containing thermally expandable resin composition sheets 100 to 120 by a blade, there may be mentioned, for example, a method in which a face-state blade such as a knife, etc., is contacted to the surface of the epoxy resin-containing thermally expandable resin composition sheets 100 to 120 and pushed it, a method in which a face-state blade such as a knife, etc., is contacted to the surface of the epoxy resin-containing thermally expandable resin composition sheets 100 to 120, and then, the blade is moved, a method in which a blade where the tip of the rod is sharp such as a nail, etc., is contacted to the surface of the epoxy resin-containing thermally expandable resin composition sheets 100 to 120, and the blade where the tip of the rod is sharp such as a nail, etc., is moved to form the linear grooves 10a to 10c, and a method in which a rotating disc-shaped blade is contacted to the surface of the epoxy resin-containing thermally expandable resin composition sheets 100 to 120, and the rotating disc-shaped blade is moved to form the linear grooves 10a to 10c, etc.

Incidentally, in place of moving the respective blades, the epoxy resin-containing thermally expandable resin composition sheets 100 to 120 may be moved, or the respective blades and the epoxy resin-containing thermally expandable resin composition sheets 100 to 120 may be moved to the opposite direction The method of forming the linear grooves 10a to 10c may be employed one kind or two or more kinds.

A thickness of the epoxy resin-containing thermally expandable resin composition layer 1 is preferably in the range of 0.3 to 4 mm, more preferably in the range of 0.5 to 3 mm.

When the thickness of the epoxy resin-containing thermally expandable resin composition layer 1 is 4 mm or less, the epoxy resin-containing thermally expandable resin composition sheets 100 to 120 can be bent freely. Also, when the thickness of the epoxy resin-containing thermally expandable resin composition layer 1 is 0.3 mm or more, if the epoxy resin-containing thermally expandable resin composition sheets 100 to 120 are exposed to heat of a fire, etc., an expansion residue with a sufficient thickness is formed so that it is excellent in fire resistance.

Next, the composition of the epoxy resin-containing thermally expandable resin composition layer 1 is explained.

The epoxy resin-containing thermally expandable resin composition layer 1 is formed by the epoxy resin-containing thermally expandable resin composition.

The epoxy resin-containing thermally expandable resin composition may be mentioned, for example, an epoxy resin-containing thermally expandable resin composition which contains an epoxy resin as a resin component(s), a phosphorus compound, a thermally expandable layered inorganic material and an inorganic filler, etc.

The resin component is not particularly limited, and there may be mentioned, for example, a resin obtained by reacting a monomer having an epoxy group and a curing agent.

The monomer having an epoxy group may be mentioned as a bi-functional glycidyl ether type, for example, a monomer of a polyethylene glycol type, a polypropylene glycol type, a neopentyl glycol type, a 1,6-hexanediol type, a trimethylolpropane type, propylene oxide-bisphenol A, hydrogenated bisphenol A type, bisphenol A type, bisphenol F type, etc.

Also, the glycidyl ester type monomer may be mentioned a monomer of a hexahydrophthalic anhydride type, a tetrahydrophthalic anhydride type, a dimer acid type, a p-oxybenzoic acid type, etc.

Further, the polyfunctional glycidyl ether type monomer may be mentioned a monomer of a phenol novolac type, an ortho-cresol type, a DPP novolac type, dicyclopentadiene, a phenol type, etc.

These may be used with a kind or two or more kinds.

Also, the curing agent may be mentioned, for example, a polyaddition type curing agent, a catalyst type curing agent, etc.

The polyaddition type curing agent may be mentioned, for example, a polyamine, an acid anhydride, a polyphenol, a polymercaptane, etc.

The catalyst type curing agent may be mentioned, for example, tertiary amines, imidazoles, a Lewis acid complex, etc. A curing method of these epoxy resins is not particularly limited, and can be carried out by the conventionally known method.

For causing brittle fracture to the epoxy resin-containing thermally expandable resin composition layer 1 by applying a stress to the epoxy resin-containing thermally expandable resin composition layer 1 onto which the linear grooves 10a to 10c had been formed to the direction where the linear grooves 10a to 10c open, a kind of the epoxy resin, the curing agent, etc., to be used, and a formulation ratio of the monomer having the epoxy group and the curing agent are to be adjusted.

Incidentally, for adjusting melt viscosity, flexibility, tackiness, etc., of the resin component(s), a material in which two or more kinds of the resin component have been blended may be used.

The phosphorus compound is not particularly limited, and may be mentioned, for example, red phosphorus, various kinds of phosphoric acid esters such as triphenyl phosphate, tricresyl phosphate, trixylenyl phosphate, cresyldiphenyl phosphate, xylenyldiphenyl phosphate, etc., a phosphoric acid metal salt such as sodium phosphate, potassium phosphate, magnesium phosphate, etc., ammonium polyphosphates, and the compound represented by the following chemical formula, etc.

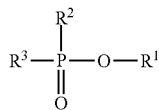

These phosphorus compounds may be used with a kind or two or more kinds in combination.

Among these, in the viewpoint of fire resistance, red phosphorus, the compound represented by the above-mentioned chemical formula, and ammonium polyphosphates are preferred, and ammonium polyphosphates are more preferred in the points of properties, safety, cost, etc.

In the above-mentioned chemical formula, $R^1$ and $R^3$ each represent a hydrogen, a linear or branched alkyl group having 1 to 16 carbon atoms or an aryl group having 6 to 16 carbon atoms.

$R^2$ represent a hydroxyl group, a linear or branched alkyl group having 1 to 16 carbon atoms, a linear or branched alkoxyl group having 1 to 16 carbon atoms, an aryl group having 6 to 16 carbon atoms or an aryloxy group having 6 to 16 carbon atoms.

The compound represented by the formula may be mentioned, for example, methylphosphonic acid, dimethyl methylphosphonate, diethyl methylphosphonate, ethylphosphonic acid, propylphosphonic acid, butylphosphonic acid, 2-methylpropylphosphonic acid, t-butylphosphonic acid, 2,3-dimethyl-butylphosphonic acid, octylphosphonic acid, phenylphosphonic acid, dioctylphenylphosphonate, dimethylphosphinic acid, methylethylphosphinic acid, methylpropylphosphinic acid, diethylphosphinic acid, dioctylphosphinic acid, phenylphosphinic acid, diethylphenylphosphinic acid, diphenylphosphinic acid, bis(4-methoxyphenyl)phosphinic acid, etc.

Above all, whereas t-butylphosphonic acid is expensive, it is preferred in the point of high flame resistance.

Ammonium polyphosphates are not particularly limited, and may be mentioned, for example, ammonium polyphosphate, melamine-modified ammonium polyphosphate, etc., and in the points of flame resistance, safety, a cost, handling property, etc., ammonium polyphosphate is suitably used.

Commercially available products may be mentioned, for example, "trade name: EXOLIT AP422" and "trade name: EXOLIT AP462" available from Clariant K.K., etc.

The phosphorus compound is considered to promote expansion of the metal carbonate by reacting with a metal carbonate such as calcium carbonate, zinc carbonate, etc., and in particular, when ammonium polyphosphate is used as the phosphorus compound, high expansion effect can be obtained. Also, it acts as an effective aggregate, and forms a residue having high shape retaining property after burning.

Next, among the respective components of the epoxy resin-containing thermally expandable resin composition, the thermally expandable layered inorganic material is explained. The thermally expandable layered inorganic material is a material which expands at the time of heating, and such a thermally expandable layered inorganic material is not particularly limited and may be mentioned, for example, vermiculite, kaolin, mica, thermally expandable graphite, etc.

The thermally expandable graphite is a conventionally known material, which is a graphite intercalation compound formed by treating powder such as natural scaly graphite, pyrolytic graphite, kish graphite, etc., with an inorganic acid such as conc. sulfuric acid, nitric acid, selenic acid, etc., and a strong oxidizing agent such as conc. nitric acid, perchloric acid, a perchlorate, a permanganate, a dichromate, a dichromate, hydrogen peroxide, etc., and is a kind of a crystalline compound which retains a layered structure of the carbon.

The thermally expandable graphite obtained by subjecting to an acid treatment as mentioned above is preferably used by further neutralizing with ammonia, an aliphatic lower amine, an alkali metal compound, an alkaline earth metal compound, etc.

The aliphatic lower amine may be mentioned, for example, monomethylamine, dimethylamine, trimethylamine, ethylamine, propylamine, butylamine, etc.

The alkali metal compound and the alkaline earth metal compound may be mentioned, for example, a hydroxide, an oxide, a carbonate, a sulfate, an organic acid salt, etc., of potassium, sodium, calcium, barium, magnesium, etc.

A grain size of the thermally expandable graphite is preferably a material in the range of 20 to 200 mesh.

If the grain size is less than 20 mesh, a degree of expansion of the graphite is small, and a sufficient fireproof heat insulating layer can be difficulty obtained, while if the grain size becomes large exceeding 200 mesh, there is a merit that a degree of expansion of the graphite is large, but dispersibility becomes poor when it is mixed and kneaded with the thermoplastic resin or the epoxy resin, and physical properties are likely lowered.

Commercially available products of the thermally expandable graphite may be mentioned, for example, "GRAFGUARD#160" and "GRAFGUARD#220" available from UCAR CARBON Co., Inc., and "GREP-EG" available from Tosoh Corporation, etc.

Next, among the respective components of the prior epoxy resin-containing thermally expandable resin composition, the inorganic filler is explained.

The inorganic filler is not particularly limited, and may be mentioned, for example, silica, diatomaceous earth, alumina, zinc oxide, titanium oxide, calcium oxide, magnesium oxide, iron oxide, tin oxide, antimony oxide, ferrites, calcium hydroxide, magnesium hydroxide, aluminum hydroxide, basic magnesium carbonate, calcium carbonate, magnesium carbonate, zinc carbonate, barium carbonate, dawsonite, hydrotalcite, calcium sulfate, barium sulfate, gypsum fiber, a potassium salt such as calcium silicate, etc., talc, clay, mica, montmorillonite, bentonite, activated clay, sepiolite, imogolite, sericite, glass fiber, glass beads, silica series balloon, aluminum nitride, boron nitride, silicon nitride, carbon black, graphite, carbon fiber, carbon balloon, charcoal powder, various kinds of metal powder, potassium titanate, magnesium sulfate, lead zirconate titanate, aluminum borate, molybdenum sulfide, silicon carbide, stainless fiber, zinc borate, various kinds of magnetic powder, slug fiber, fly ash, inorganic series phosphorus compound, silica-alumina fiber, alumina fiber, silica fiber, zirconia fiber, etc.

These may be used a kind or two or more kinds.

The inorganic filler acts as a role of an aggregate, and contributes to improve strength of the expansion heat insulating layer formed after heating or to increase heat capacity of the same.

Therefore, a metal carbonate represented by calcium carbonate and zinc carbonate, and a hydrated inorganic product represented by aluminum hydroxide and magnesium hydroxide which act as a role like an aggregate as well as provide a heat absorption effect at the time of heating are preferred, and a carbonate of an alkali metal, an alkaline earth metal, and a metal of Group IIb of the Periodic Table or a mixture of these compounds and the hydrated inorganic product are preferred.

When the inorganic filler to be used in the present invention is a particulate, the particle size is preferably within the range of 0.5 to 200 μm, more preferably within the range of 1 to 50 μm.

When an amount of the inorganic filler to be added is a little, the dispersibility markedly affects to the properties so that a material having a small particle size is preferred, and when the particle size is 0.5 μm or more, secondary aggregation can be prevented and dispersibility becomes good in some cases.

Also, when an amount of the inorganic filler to be added is much, a viscosity of the resin composition becomes high with the progress of highly filling and moldability is lowered, but in the point that the viscosity of the resin composition can be lowered by making the particle size large, a material having a large particle size is preferred among the above-mentioned range.

Incidentally, if the particle size exceeds 200 μm, the surface property of the molded product and the mechanical property of the resin composition are lowered in some cases.

Among the inorganic fillers, in particular, a metal carbonate such as calcium carbonate, zinc carbonate, etc., which acts as a role like an aggregate; and a hydrated inorganic product such as aluminum hydroxide, magnesium hydroxide, etc., which acts as a role like an aggregate as well as provide a heat absorption effect at the time of heating are preferred.

To use the hydrated inorganic material and the metal carbonate in combination is considered to be markedly contributed to improve strength of the combustion residue or to increase heat capacity.

Among the inorganic fillers, in particular, a hydrated inorganic material such as aluminum hydroxide, magnesium hydroxide, etc., is preferred in the points that high heat resistance can be obtained by reducing raising of the temperature since heat absorption occurs due to water formed by the dehydration reaction at the time of heating, and strength of the combustion residue is improved since an oxide remains as the combustion residue which acts as an aggregate.

Also, magnesium hydroxide and aluminum hydroxide are preferably used in combination since temperature regions showing their dehydrating effects are different from each other so that if these are used in combination, the temperature regions showing the dehydrating effect are broadened whereby more effective suppressing effect against raising the temperature can be obtained.

When a particle size of the hydrated inorganic product is small, the bulk becomes large and highly filling becomes difficult so that a material having a large particle size is preferred to accomplish higher filling for heightening the dehydration effect. More specifically, when the particle size is 18 μm, it has been known that a filling limit amount increases about 1.5-fold as compared with that of the particle size of 1.5 μm. Further, higher filling is possible by using a material having large particle size and a material having small particle size in combination.

Commercially available products of the hydrated inorganic product may be mentioned, for example, as aluminum hydroxide, "trade name: HIGILITE H-42M" (available from SHOWA DENKO K.K.) having a particle size of 1 μm, "trade name: HIGILITE H-31" (available from SHOWA DENKO K.K.) having a particle size of 18 μm, etc.

Commercially available products of the calcium carbonate may be mentioned, for example, "trade name: Whiton SB Red" (available from SHIRAISHI CALCIUM KAISHA Ltd.) having a particle size of 1.8 μm, "trade name: BF300" (available from BIHOKU FUNKA KOGYO CO., LTD.) having a particle size of 8 μm, etc.

As explained at the beginning, the epoxy resin-containing thermally expandable resin composition to be used in the present invention may be mentioned a material containing the resin component(s) such as an epoxy resin, etc., the thermally expandable layered inorganic material and the inorganic filler, etc., as explained above, and the formulation thereof is explained as follows.

The epoxy resin-containing thermally expandable resin composition preferably contains the thermally expandable layered inorganic material in the range of 20 to 350 parts by weight and the inorganic filler in the range of 50 to 400 parts by weight based on 100 parts by weight of the resin component(s) such as the epoxy resin, etc. Also, the sum of the thermally expandable layered inorganic material and the inorganic filler is preferably in the range of 200 to 600 parts by weight.

Also, when the phosphorus compound is added to the epoxy resin-containing thermally expandable resin composition, a formulation amount of the phosphorus compound is preferably in the range of 30 to 300 parts by weight based on 100 parts by weight of the resin component(s) such as the epoxy resin, etc.

Such a resin composition expands by heat to form a fireproof heat insulating layer. According to this formulation, the thermally expandable fireproof material expands by heat such as a fire, etc., and a necessary volume expansion rate can be obtained. After the expansion, a residue having a predetermined heat insulating property as well as a predetermined strength can be formed, and a stable fireproof property can be accomplished.

If the amount of the layered inorganic material is less than 20 parts by weight, an expansion ratio is insufficient, and sufficient fire resistant and fireproof properties cannot be obtained in some cases. On the other hand, if the amount of the layered inorganic material exceeds 350 parts by weight, a cohesive force is insufficient, and a strength necessary for a molded product cannot be obtained in some cases. Also, if the amount of the inorganic filler is less than 50 parts by weight, a residual volume amount after burning is decreased, so that a sufficient fireproof heat insulating layer cannot be obtained in some cases. Further, a ratio of the combustible material is increased, so that flame resistance is lowered in some cases.

On the other hand, if the amount of the inorganic filler exceeds 400 parts by weight, a formulation ratio of the resin component is lowered, so that a cohesive force is insufficient and strength as the molded product can be difficulty obtained.

If the total amount of the thermally expandable layered inorganic material and the inorganic filler in the epoxy resin-containing thermally expandable resin composition is less than 200 parts by weight, an amount of the thermal expansion residue after burning is not sufficient and sufficient fire resistant property can be hardly obtained, while if it exceeds 600 parts by weight, lowering in mechanical properties is remarkable and it cannot be endured for practical use in some cases.

Further, the epoxy resin-containing thermally expandable resin composition to be used in the present invention may contain, in addition to an antioxidant such as a phenol series, an amine series, a sulfur series, etc., an additive such as a metal damage preventing agent, an antistatic agent, a stabilizer, a cross-linking agent, a lubricant, a softening agent, a pigment, a tackifier resin, etc., and a tackifier such as a polybutene, a petroleum resin, etc., if necessary, within the range which does not impair the objects of the present invention.

Next, a manufacturing method of the epoxy resin-containing thermally expandable resin composition is explained. The manufacturing method of the epoxy resin-containing thermally expandable resin composition is not particularly limited, and the thermally expandable resin composition can be obtained, for example, by the method in which the epoxy resin-containing thermally expandable resin composition is suspended in an organic solvent or melted by heating to prepare a paint state, the method in which it is dispersed in a solvent to prepare a slurry, etc., or the method in which the epoxy resin-containing thermally expandable resin composition is melted under heating, etc.

The epoxy resin-containing thermally expandable resin composition can be obtained by mixing and kneading the above-mentioned respective components by using a conventionally known device such as a single screw extruder, a twin screw extruder, a Bunbary mixer, a kneader mixer, a mixing and kneading roller, a Raikai mixer, a planetary stirring machine, etc.

Also, a monomer having an epoxy group and a curing agent are separately mixed and kneaded with a filler, and the material can be obtained by mixing and kneading these immediately before the molding by using a static mixer, a dynamic mixer, etc.

The epoxy resin-containing thermally expandable resin composition to be used in the present invention can be obtained by the method explained above.

The epoxy resin-containing thermally expandable resin composition explained above is laminated between the substrates to obtain a laminate having a substrate layer 2, an epoxy resin-containing thermally expandable resin composition layer 1 and a substrate layer 6.

The linear grooves can be formed by, for example, the method in which a metal mold or a blade having a desired shape is pressed to the laminate, etc.

By cutting the laminate to a desired length, the epoxy resin-containing thermally expandable resin composition sheets 100 to 120 can be obtained.

The epoxy resin-containing thermally expandable resin composition sheets 100 to 120 comprise an epoxy resin-containing thermally expandable resin composition layer 1 and a substrate layer 2 as essential constitutional elements, and one or two or more substrate layers 6 may be laminated, if necessary. Next, the substrate layer to be used in the present invention is explained.

The substrate layer to be used in the present invention may be mentioned, for example, a combustible layer, an incombustible layer, etc.

The raw material to be used in the combustible layer may be mentioned, for example, one kind or two or more kinds of a cloth material, a paper material, a wood, a natural resin, a synthetic resin, etc.

Also, the raw material to be used in the incombustible layer may be mentioned, for example, one kind or two or more kinds of a metal, an inorganic material, etc.

The cloth material may be mentioned, for example, a material comprising a woven fabric or non-woven fabric such as a cotton, silk, Nylon, a polyester, a polypropylene, etc.

The paper material may be mentioned, for example, paper in which a fibrous material taken out from a plant such as wood, etc., or chemical fiber is dispersed in a dispersant such as water, etc., which is filtered and formed a uniform layer followed by drying, etc.

There may be mentioned a processed paper obtained by coating a paint, a water repellent preparation, etc., to the paper, a corrugated cardboard manufactured by sandwiching a corrugated paper between plane papers called as a liner and adhered them, etc.

The wood is not limited to a wood raw material obtained from a natural wood, and may be mentioned, for example, laminated lumber, laminated wood, laminated wood slab, etc., each containing a wood raw material.

The natural resin may be mentioned, for example, a polymer, a natural rubber, etc., which comprises a cellulose derivative, gelatin, an alginate, chitosan, pullulan, pectin, carrageenan, a protein, tannin, lignin, rosin acid, etc., as a main component, etc.

The synthetic resin may be mentioned, for example, a synthetic rubber such as isoprene rubber, butadiene rubber, 1,2-polybutadiene rubber, styrene-butadiene rubber, chloroprene rubber, nitrile rubber, butyl rubber, ethylene-propylene rubber, chlorosulfonylated polyethylene, acrylic rubber, epichlorohydrin rubber, silicone rubber, fluorine rubber, urethane rubber, polyisobutylene rubber, butyl chloride rubber, etc., a polyolefin resin such as a polypropylene resin, a polyethylene resin, a poly(1-)butene resin, a polypentene resin, etc., a polystyrene resin, an acrylonitrile-butadiene-styrene resin, a polycarbonate resin, an acrylic resin, a polyamide resin, a polyvinyl chloride resin, a polyethylene terephthalate resin, a polybutylene terephthalate resin, a polyphenylene ether resin, a wholly aromatic polyester resin, a polyether sulfone resin, a phenol resin, a polyurethane resin, an epoxy resin, etc.

The metal may be mentioned, for example, aluminum, iron, stainless, tin, lead, tin-lead alloy, copper, etc.

Also, a metal foil is preferably used as the metal, and the metal foil may be mentioned, for example, an aluminum foil, an iron foil, a stainless foil, a tin foil, a lead foil, a tin-lead alloy foil, a copper foil, etc.

The inorganic material may be mentioned, for example, glass wool, rock wool, ceramic wool, gypsum fiber, carbon fiber, stainless fiber, slug fiber, silica alumina fiber, alumina fiber, silica fiber, zirconia fiber, etc.

As the inorganic fiber layer, an inorganic fiber cloth using the inorganic fiber is preferably used.

Also, as the inorganic fiber to be used for the inorganic fiber layer, a material in which metal foils are laminated is preferably used.

Specific examples of the metal foil laminate inorganic fiber may be further preferably mentioned, for example, aluminum foil laminate glass cloth, copper foil laminate glass cloth, etc.

The epoxy resin-containing thermally expandable resin composition sheets 100 to 120 can be obtained, for example, by laminating an epoxy resin-containing thermally expandable resin composition layer, an inorganic fiber layer, a metal foil layer, etc. For laminating these materials, in addition to simultaneous melt extrusion, heat pressing, etc., it can be formed by means of pasting the respective layers by an adhesive, etc. The epoxy resin-containing thermally expandable resin composition sheets 100 to 120 preferably have a metal foil layer at the outermost surface.

Figure 8:
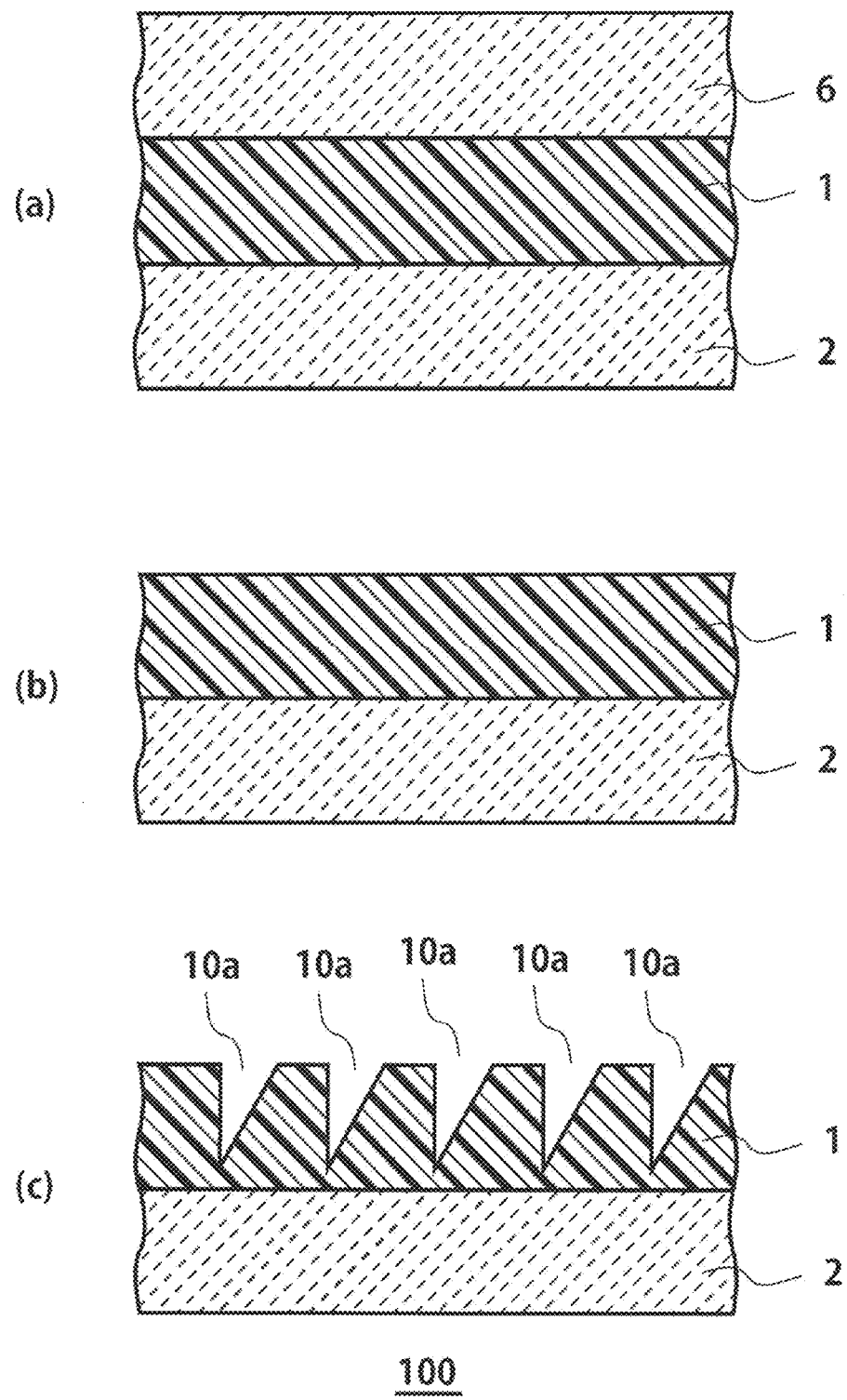
FIG. 8 is a schematic partial sectional view for explaining a manufacturing process of the epoxy resin-containing thermally expandable resin composition sheet according to the first embodiment of the present invention.

FIG. 8 is a schematic partial sectional view for explaining a manufacturing process of the epoxy resin-containing thermally expandable resin composition sheet 100 according to the first embodiment of the present invention.

In FIG. 8(*a*), nonwoven fabric is used as the substrate layer 2, and a release paper is used as the substrate layer 6.

As illustrated in FIG. 8(*b*), the release paper is removed to obtain an epoxy resin-containing thermally expandable resin composition sheet 100 having two layers consisting of the substrate layer 2 which consists of nonwoven fabric, and the epoxy resin-containing thermally expandable resin composition layer 1.

Next, as illustrated in FIG. 8(*c*), a blade which is perpendicular to the longitudinal direction of the epoxy resin-containing thermally expandable resin composition sheet 100, and longer than the width of the epoxy resin-containing thermally expandable resin composition sheet 100 is pressed to the epoxy resin-containing thermally expandable resin composition sheet 100 to form linear grooves 10*a* thereon.

The respective linear grooves 10*a* formed onto the epoxy resin-containing thermally expandable resin composition sheet 100 are continuous grooves each of which reaches from one side 3 to the other side 4 of the epoxy resin-containing thermally expandable resin composition sheet 100, as illustrated in the previous FIG. 1.

Figure 9:
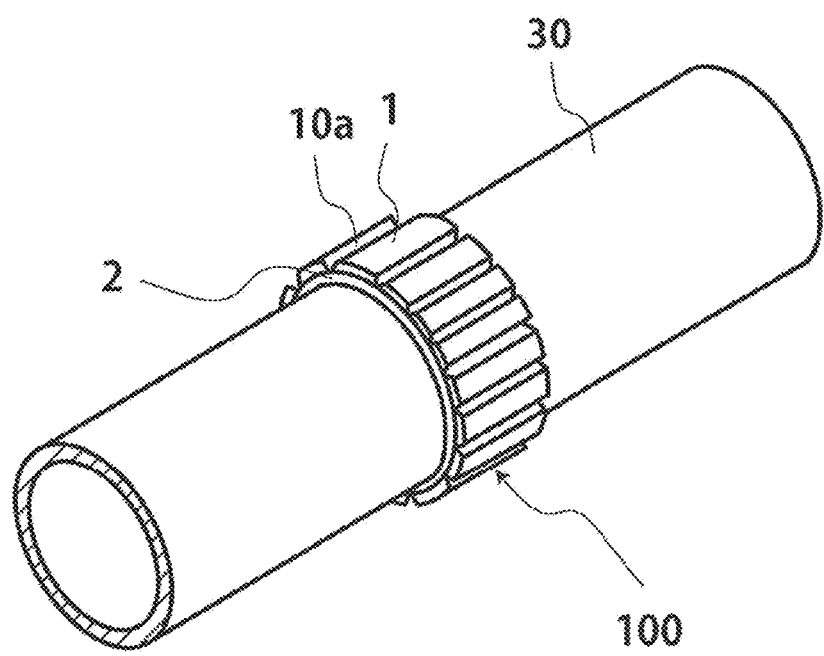
FIG. 9 is a schematic partial perspective view for explaining a relation between the epoxy resin-containing thermally expandable resin composition sheet according to the first embodiment of the present invention and the pipe(s).
Figure 10:
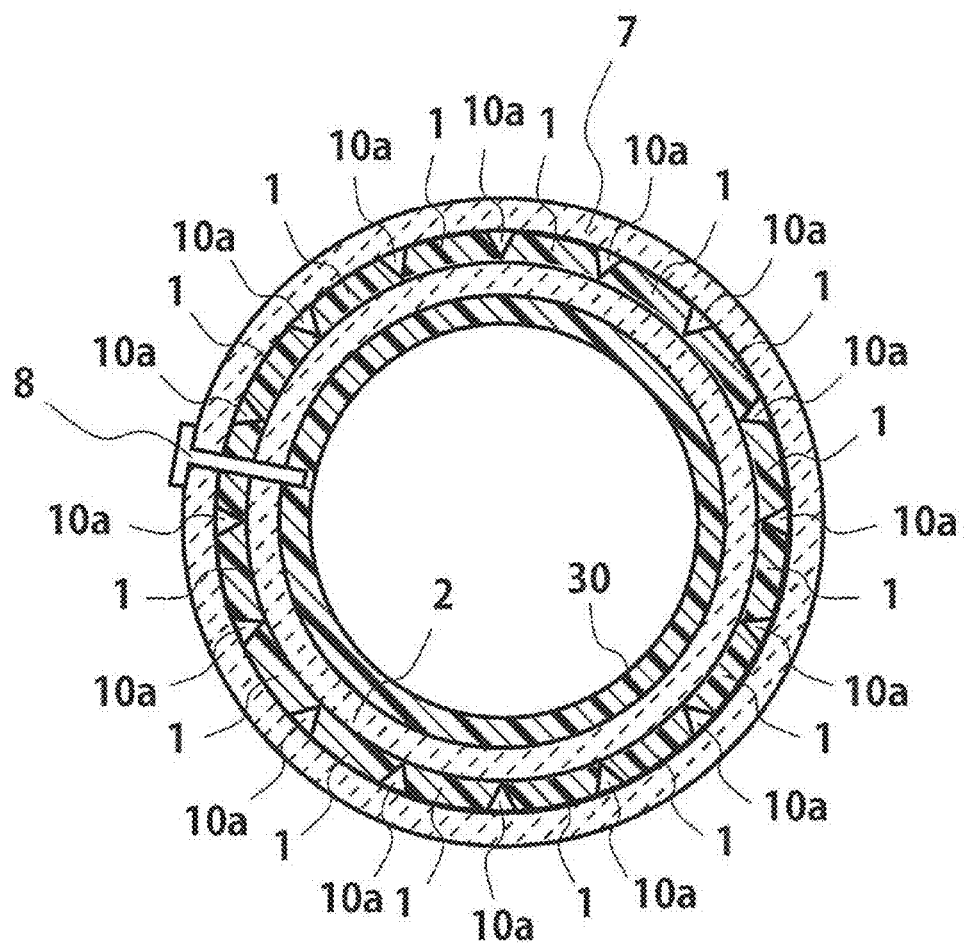
FIG. 10 is a schematic partial sectional view for explaining a state in which a base tape is provided at the outermost surface of the epoxy resin-containing thermally expandable resin composition sheet according to the first embodiment.

FIG. 9 is a schematic partial perspective view for explaining a relation between the epoxy resin-containing thermally expandable resin composition sheet according to the first embodiment of the present invention and pipes, and FIG. 10 is a schematic partial sectional view for explaining a state in which a base tape is provided at the outermost surface of the epoxy resin-containing thermally expandable resin composition sheet according to the first embodiment.

The epoxy resin-containing thermally expandable resin composition layer 1 of the epoxy resin-containing thermally expandable resin composition sheet 100 is bent to the direction that the continuously formed linear grooves 10*a* open, and the epoxy resin-containing thermally expandable resin composition sheet 100 can be wound to the pipe 30 toward the outside of the linear grooves 10*a*.

The epoxy resin-containing thermally expandable resin composition sheet 100 is preferably wound the circumference of the pipe 30 once around or once or more rounds.

Since the linear grooves 10*a* are formed onto the epoxy resin-containing thermally expandable resin composition sheet 100, the epoxy resin-containing thermally expandable resin composition sheet 100 can be bent easily.

Next, a base tape 7 is wound to the circumference of the epoxy resin-containing thermally expandable resin composition sheet 100.

The raw material of the base tape 7 is the same as the case of the substrate layer explained before, and is a material containing at least one kind of an incombustible material such as a metal, an inorganic material, etc.

As the base tape 7, an aluminum foil laminate glass cloth was used. When the base tape 7 is to be wound to the circumference of the epoxy resin-containing thermally expandable resin composition sheet 100, an aluminum foil is made to be the outermost surface.

After winding the base tape 7 to the circumference of the epoxy resin-containing thermally expandable resin composition sheet 100 without any gap, the epoxy resin-containing thermally expandable resin composition sheet 100 and the base tape 7 were fixed to the pipe 30 with fixing means such as a pin, a screw, a tacker, a stapler, adhesive tape, etc.

In FIG. 10, a pin 8 is used as the fixing means.

A number of winding the epoxy resin-containing thermally expandable resin composition sheet 100 to the circumference of the pipe 30 is preferably set to such an amount when the epoxy resin-containing thermally expandable resin composition layer 1 is expanded by being exposed to heat of a fire, etc., the formed expansion residue can block the inside of the pipe 30, in consideration with an expansion rate and thickness of the epoxy resin-containing thermally expandable resin composition layer 1 contained in the epoxy resin-containing thermally expandable resin composition sheet 100.

When the epoxy resin-containing thermally expandable resin composition layer 1 of the epoxy resin-containing thermally expandable resin composition sheet 100 is provided at the outermost layer of the pipe 30, the base tape 7 is preferably provided to the circumference of the epoxy resin-containing thermally expandable resin composition sheet 100.

Even when the pipe 30 was deformed or destroyed by heat of a fire, etc., an expansion residue of the epoxy resin-containing thermally expandable resin composition layer 1 formed by heat of a fire, etc., is retained by the base tape 7.

Since inside of the base tape 7 is blocked by the expansion residue, spreading of a flame, smoke of a fire, etc., through inside of the pipe 30 can be prevented.

The pipe 30 to be used in the present invention may be mentioned, for example, a pipe for liquid transfer such as a refrigerant pipe, a heat medium pipe, a water pipe, a sewer pipe, a feeding/draining pipe, a fuel transfer pipe, a hydraulic piping, etc., a pipe for gas transfer such as a gas pipe, a pipe for transfer a medium for heating and cooling, an air pipe, etc., a cable such as a wire and cable, an optical fiber cable, a cable for shipping, etc., and a sleeve for inserting these pipes for liquid transfer, pipes for gas transfer, cables, etc., thereinto, etc.

Among these, in the viewpoint of workability, a pipe for liquid transfer such as a refrigerant pipe, a heat medium pipe, a water pipe, a sewer pipe, a feeding/draining pipe, a fuel transfer pipe, a hydraulic piping, etc., is preferred, and a refrigerant pipe or a heat medium pipe is more preferred.

The pipe(s) may be used with a kind or two or more kinds of a pipe for liquid transfer, a pipe for gas transfer, a cable, a sleeve, etc.

A shape of the pipe 30 exemplified in FIG. 9 and FIG. 10 is a cylindrical, but the shape of the pipes to be used in the present invention is not limited to the cylindrical.

The shape of the pipes to be used in the present invention may be used those other than the cylindrical, and may be mentioned, for example, a shape in which a cross sectional shape in the vertical direction to the longitudinal direction of the pipe 30 of a polygon such as a triangle, a rectangle, etc., a shape in which lengths of the adjacent sides are different such as a rectangular, etc., a shape in which adjacent interior angles are different such as a parallelogram, etc., an elliptical shape, a round shape, etc. Among these, a cross sectional shape of a round shape, a rectangle shape, etc., is preferred since these are excellent in workability.

By adjusting the distance between the linear grooves 10*a* and 10*a* formed onto the epoxy resin-containing thermally expandable resin composition layer 1 of the epoxy resin-containing thermally expandable resin composition sheet 100, the epoxy resin-containing thermally expandable resin composition sheet 100 can be easily wound to the outer periphery of the pipe(s) having an optional shape.

The distance between the linear grooves 10*a* and 10*a* can be optionally set in consideration with the outer shape, curvature, etc., of the pipe(s), and in general, preferably in the range of 5 to 100 mm, more preferably in the range of 10 to 50 mm, and the distance between the linear grooves 10*a* and 10*a* is further preferably the same.

Also, the respective linear grooves 10*a* formed onto the epoxy resin-containing thermally expandable resin composition layer 1 are preferably in parallel from each other in the viewpoint of handling property.

The cases of the epoxy resin-containing thermally expandable resin composition sheets 110 and 120 according to the second and the third embodiments are the same as above.

The epoxy resin-containing thermally expandable resin composition sheets 100 to 120 can be used without depending on the outer shape of the pipe 30 so that they are excellent in handling property.

Also, by winding the epoxy resin-containing thermally expandable resin composition sheets 100 to 120 to the pipe 30, fire resistance of the pipe 30 can be improved, so that the epoxy resin-containing thermally expandable resin composition sheets 100 to 120 can be preferably used for the uses for improving fire resistant property of the pipe 30.

Next, the method for constructing a penetration structure for a fireproof compartment using the epoxy resin-containing thermally expandable resin composition sheet 100 according to the first embodiment is explained.

Figure 11:
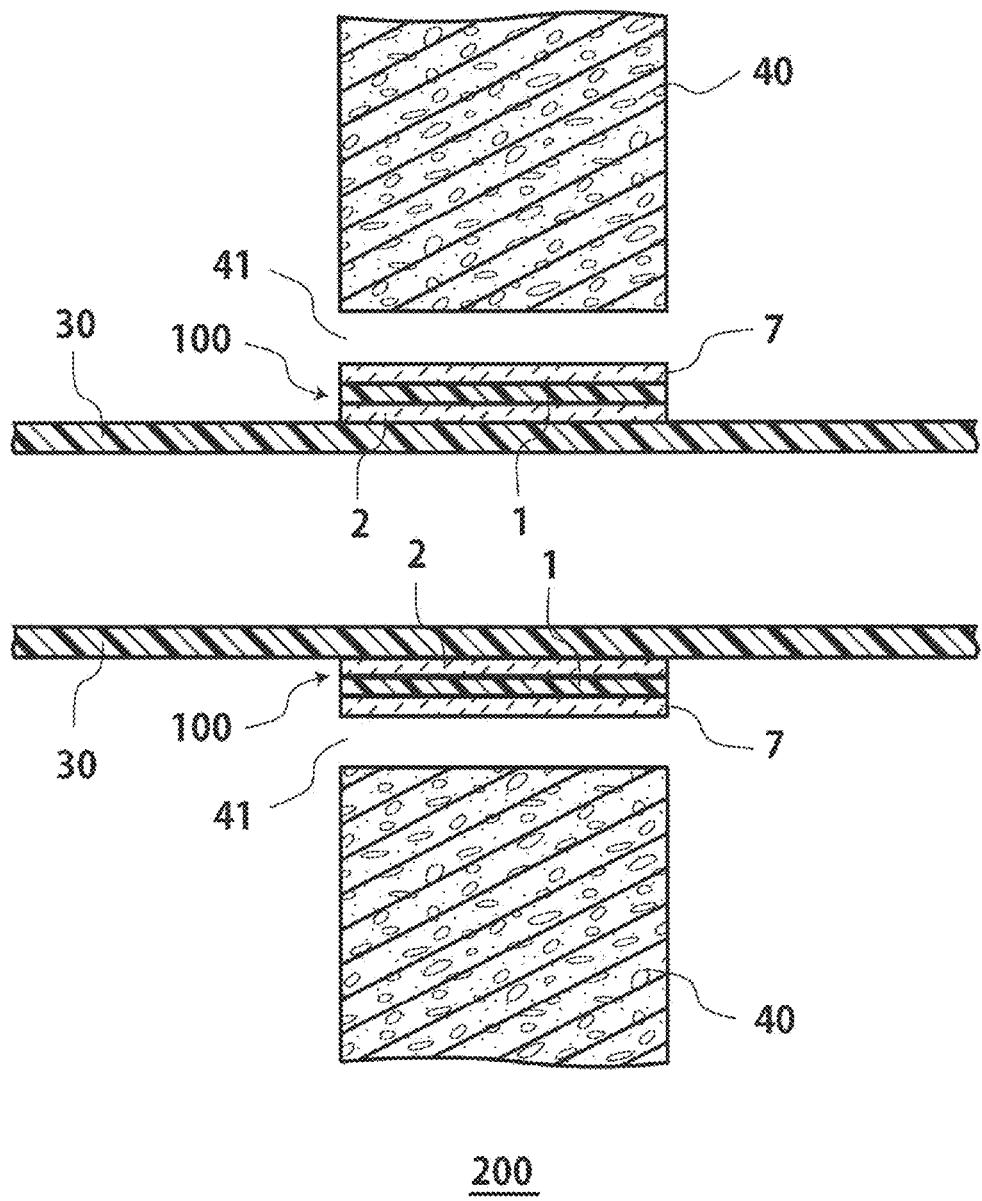
FIG. 11 is a schematic partial sectional view for explaining a state in which the pipe is penetrated through the through hole provided to the compartment.

FIG. 11 is a schematic partial sectional view for explaining a state in which the pipe 30 is penetrated through the through hole 41 provided to the compartment 40.

The epoxy resin-containing thermally expandable resin composition sheet 100 is wound to the pipe 30 penetrated through the through hole 41 provided to the compartment 40 with the linear grooves 10*a* of the epoxy resin-containing thermally expandable resin composition layer 1 toward the outside.

Next, as explained in the above FIG. 9 and FIG. 10, a base tape 7 consisting of an aluminum foil laminate glass cloth is so wound to the circumference of the epoxy resin-containing thermally expandable resin composition sheet 100 that the aluminum foil becomes the outermost surface.

Figure 12:
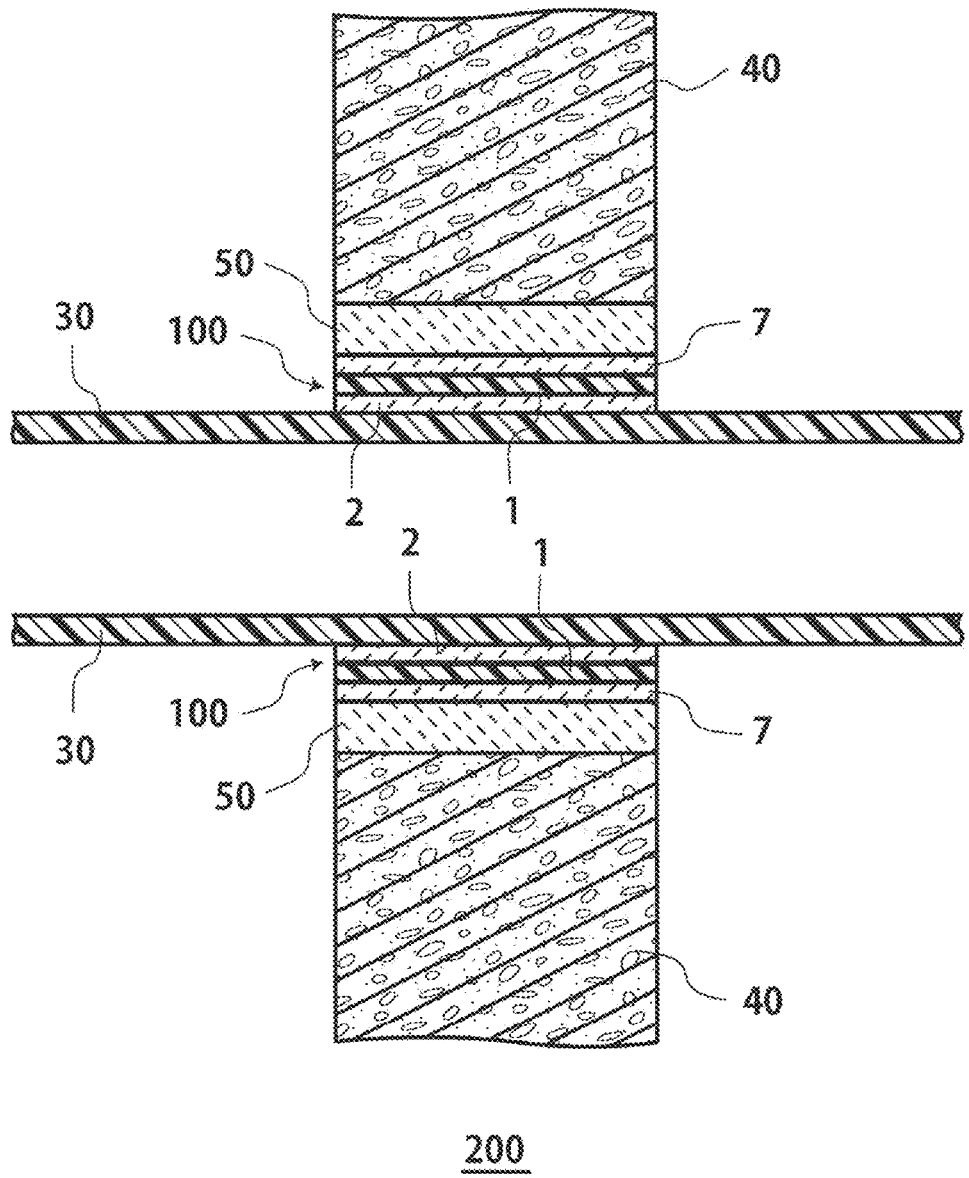
FIG. 12 is a schematic sectional view for explaining a penetration structure for a fireproof compartment according to the first embodiment.

FIG. 12 is a schematic sectional view for explaining a penetration structure for a fireproof compartment according to the first embodiment.

After winding the epoxy resin-containing thermally expandable resin composition sheet 100 and the base tape 7 to the pipe 30, the gap with the through hole 41 provided to the compartment 40 is filled with an incombustible material 50 to obtain a penetration structure for a fireproof compartment 200.

In FIG. 11 and FIG. 12, a wall is used as the compartment 40.

Specific examples of the compartment 40 which can be used in the present invention may be mentioned, for example, a wall of a building, a fireproof compartment of a ship or a steel plate provided at a cabin, etc.

Also, the compartment 40 to be used in the present invention is not limited to a perpendicular compartment, and may be used a horizontal compartment such as a floor, a ceiling, etc., of a building, a fireproof compartment of a ship or a steel plate of a floor, a ceiling, etc., provided at a cabin, etc.

Specific examples of the compartment 40 to be used in the present invention may be mentioned, for example, a concrete slab, a heat resistant panel, etc., of a floor, a ceiling, a wall, etc.

The heat resistant panel may be mentioned, for example, a cement series panel, an inorganic ceramic series panel, etc.

The cement series panel may be mentioned, for example, a hard wooden piece cement slub, an inorganic fiber-containing slate board, an autoclaved lightweight concrete plate, a mortar plate, a precast concrete plate, etc.

The inorganic ceramic series panel may be mentioned, for example, a gypsum board, a calcium silicate plate, a calcium carbonate plate, a mineral wool plate, a ceramics series panel, etc.

Here, the gypsum board may be specifically mentioned a material in which a lightweight material such as sawduct and perlite, etc., is mixed with calcined plaster, and the mixture is molded by pasting cardboards at the both surfaces, for example, normal gypsum boards (based on JIS A6901: GB-R), decorated gypsum boards (based on JIS A6911: GB-D), waterproof gypsum boards (based on JIS A6912: GB-S), reinforced gypsum boards (based on JIS A6913: GB-F), gypsum acoustic boards (based on JIS A6301: GB-P), etc.

The heat resistant panel may be used with a kind or two or more kinds.

The incombustible material 50 may be mentioned, for example, mortar, putty, caulking, etc.

Next, the method for constructing a penetration structure for a fireproof compartment using the epoxy resin-containing thermally expandable resin composition sheet 110 according to the second embodiment is explained.

Similarly to the case of FIG. 4 to FIG. 6 explained previously, the epoxy resin-containing thermally expandable resin composition sheet 110 is bent to the direction in which the linear grooves 10*b* formed onto the epoxy resin-containing thermally expandable resin composition sheet 110 open, the epoxy resin-containing thermally expandable resin composition layer 1 is cracked.

By cracking the epoxy resin-containing thermally expandable resin composition layer 1 along with the linear grooves 10*b*, the epoxy resin-containing thermally expandable resin composition layer 1 is divided into a plural number of epoxy resin-containing thermally expandable resin composition pieces 5.

The epoxy resin-containing thermally expandable resin composition pieces 5 are fixed to the substrate layer 2, so that after cracking the epoxy resin-containing thermally expandable resin composition layer 1, the epoxy resin-containing thermally expandable resin composition pieces 5 can be prevented from dropping from the substrate layer 2.

Also, by selecting a soft raw material as the substrate layer 2, the epoxy resin-containing thermally expandable resin composition sheet 110 can be bent freely.

Figure 13:
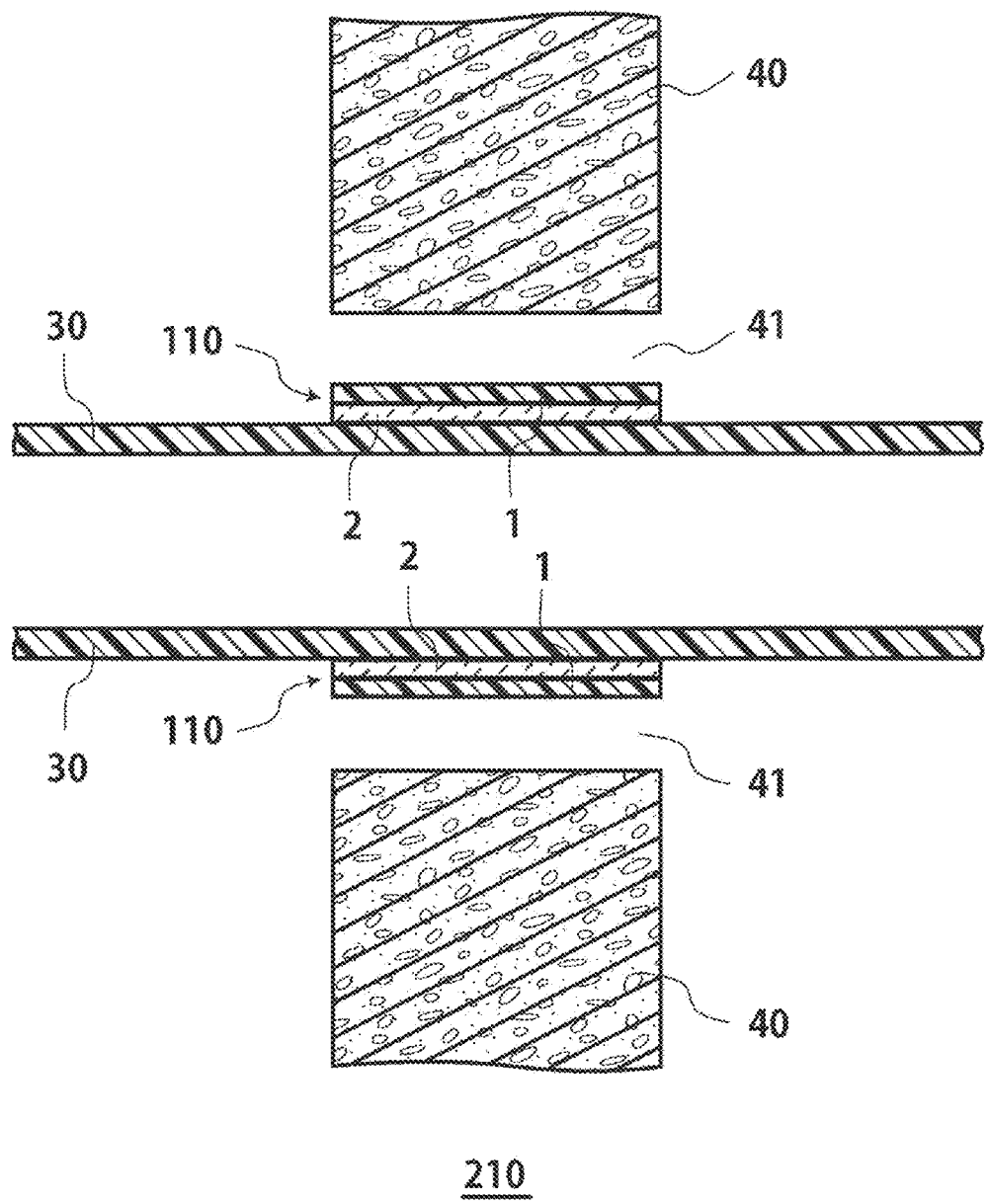
FIG. 13 is a schematic partial sectional view for explaining a state in which the pipe is penetrated through the through hole provided to the compartment.

FIG. 13 is a schematic partial sectional view for explaining a state in which the pipe 30 is penetrated through the through hole 41 provided to the compartment 40.

The epoxy resin-containing thermally expandable resin composition sheet 110 is so wound to the pipe 30 penetrating through the through hole 41 provided to the compartment 40 that the epoxy resin-containing thermally expandable resin composition pieces 5 of the epoxy resin-containing thermally expandable resin composition layer 1 became outside.

Figure 14:
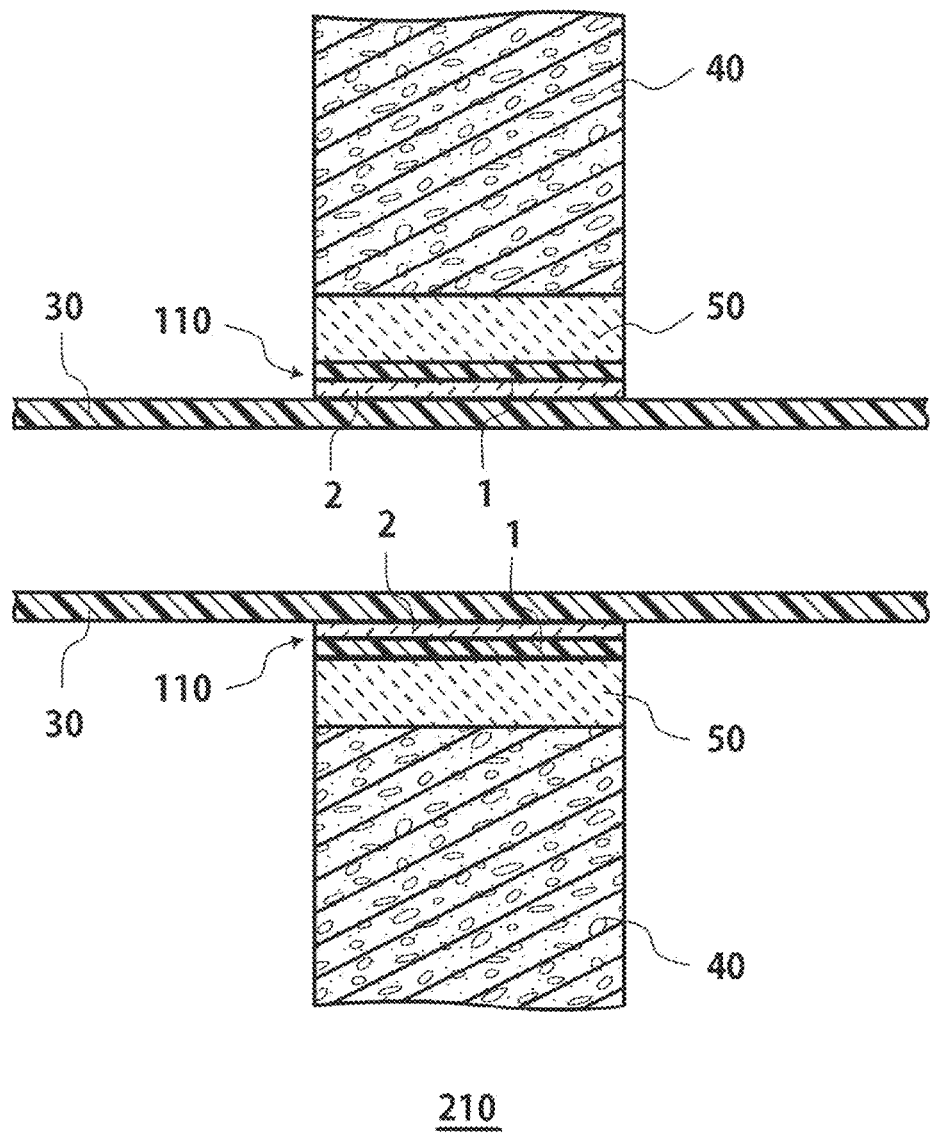
FIG. 14 is a schematic sectional view for explaining a penetration structure for a fireproof compartment according to the second embodiment.

FIG. 14 is a schematic sectional view for explaining a penetration structure for a fireproof compartment according to the second embodiment.

The epoxy resin-containing thermally expandable resin composition sheet 110 is wound to the pipe 30. Next, the gap with the through hole 41 provided to the compartment 40 is filled with the incombustible material 50 to obtain a penetration structure for a fireproof compartment 210.

As illustrated in FIG. 14, in the case of the penetration structure for the fireproof compartment 210 according to the second embodiment, the incombustible material 50 is provided at the outside of the epoxy resin-containing thermally expandable resin composition layer 1.

When the penetration structure for a fireproof compartment 210 is exposed to heat of a fire, etc., an expansion residue of the epoxy resin-containing thermally expandable resin composition layer 1 is formed toward the inside of the incombustible material 50.

The through hole 41 can be blocked by the expansion residue, spreading of a flame, smoke, etc., of a fire, etc., from one side of the compartment 40 to the other side can be prevented.

In the case of the penetration structure for a fireproof compartment 210, as compared with the previous case of the penetration structure for a fireproof compartment 200, to use the base tape 7 is omitted.

The walls exemplified in FIG. 13 and FIG. 14 each comprise a single layer structure. At the inner surface of the through hole 41 provided to the compartment, an incombustible material 50 is provided.

Even when the penetration structure for a fireproof compartment 210 is exposed to heat of a fire, etc., the incombustible material 50 remains without being destroyed by fire.

The expansion residue due to the epoxy resin-containing thermally expandable resin composition layer 1 contained in the epoxy resin-containing thermally expandable resin composition sheet 110, which is formed by, heat of a fire, etc. is retained by the incombustible material 50.

Therefore, when a wall of a single layer structure which can prevent from entering a flame such as a fire, etc., into inside is used as the compartment 40, installation of the base tape 7 used in the penetration structure for a fireproof compartment 200 previously mentioned can be omitted.

Next, the method for constructing a penetration structure for a fireproof compartment using the epoxy resin-containing thermally expandable resin composition sheet 120 according to the third embodiment is explained.

In the epoxy resin-containing thermally expandable resin composition sheet 120 according to the third embodiment, the substrate layers 2 and 6 are laminated onto both surfaces of the epoxy resin-containing thermally expandable resin composition layer 1.

In the case of the epoxy resin-containing thermally expandable resin composition sheet 120, an aluminum foil laminate glass cloth is used as the substrate layer 2, and nonwoven fabric is used as the substrate layer 6.

The substrate 2 is so provided that the aluminum foil becomes the outermost layer.

As explained in the prior FIG. 7, the linear grooves 10c are penetrated through the substrate layer 6 laminated on one face A' of the epoxy resin-containing thermally expandable resin composition sheet 120, and reached to the epoxy resin-containing thermally expandable resin composition layer 1.

Figure 15:
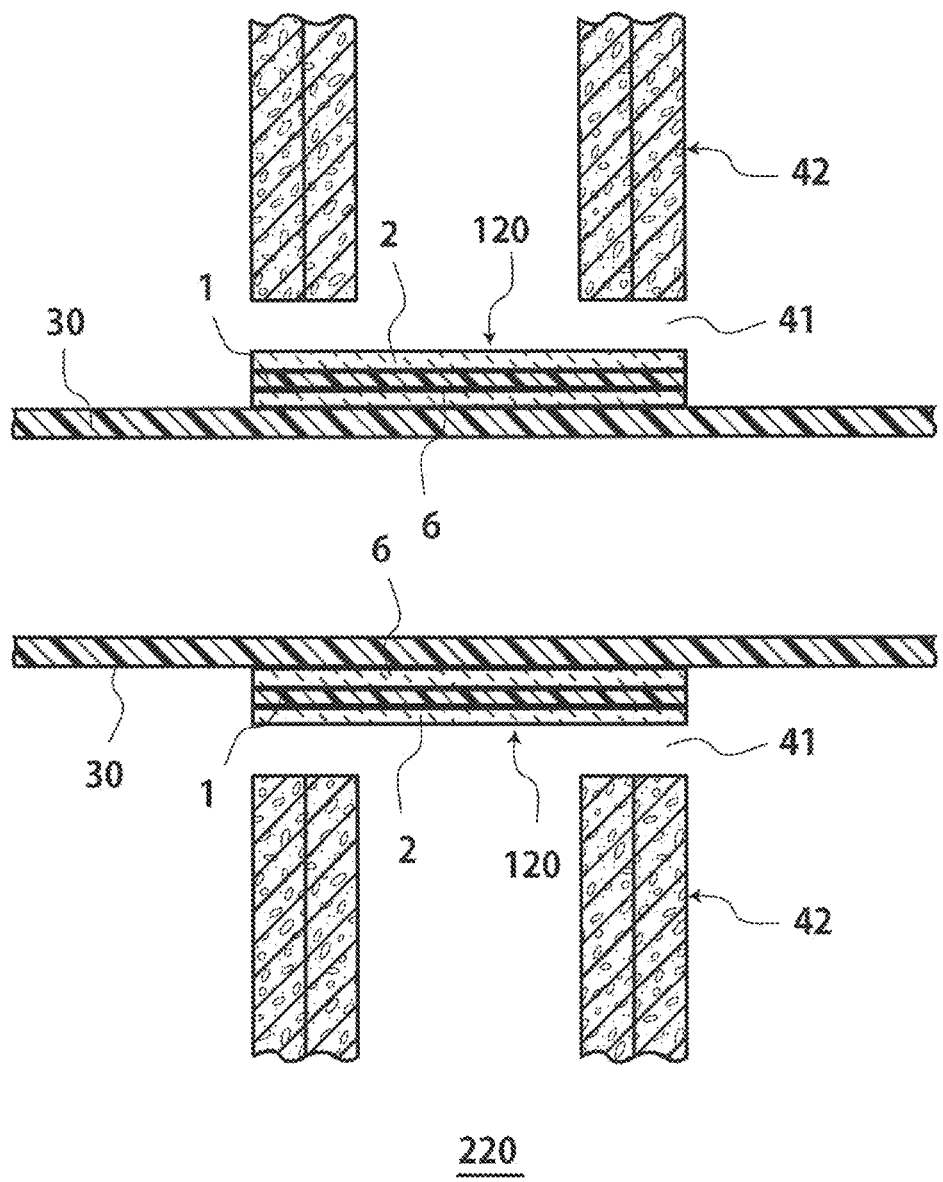
FIG. 15 is a schematic partial sectional view for explaining a state in which the pipe is penetrated through the through hole provided to the compartment.

FIG. 15 is a schematic partial sectional view for explaining a state in which the pipe 30 is penetrated through the through hole 41 provided at the compartment 42.

In FIG. 15, a hollow wall is used as the compartment 42.

When the hollow wall is used as the compartment, an incombustible material is preferably contained in at least one substrate layer laminated at the outside of the epoxy resin-containing thermally expandable resin composition layer contained in the epoxy resin-containing thermally expandable resin composition sheet.

When the incombustible material is contained in at least one substrate layer laminated at the outside of the epoxy resin-containing thermally expandable resin composition layer, an expansion residue formed by being exposed the epoxy resin-containing thermally expandable resin composition layer to heat of a fire, etc., is supported by the incombustible material, so that entering a flame, smoke, etc., of a fire, etc., into the inside of the hollow wall can be prevented.

The epoxy resin-containing thermally expandable resin composition sheet 120 is so wound to the pipe 30 penetrating through the through hole 41 provided to the compartment 42 that one face A' (see FIG. 7) of the epoxy resin-containing thermally expandable resin composition sheet 120, i.e., one face at the side onto which the linear grooves 10c had been formed is faced toward the pipe 30 side.

Figure 16:
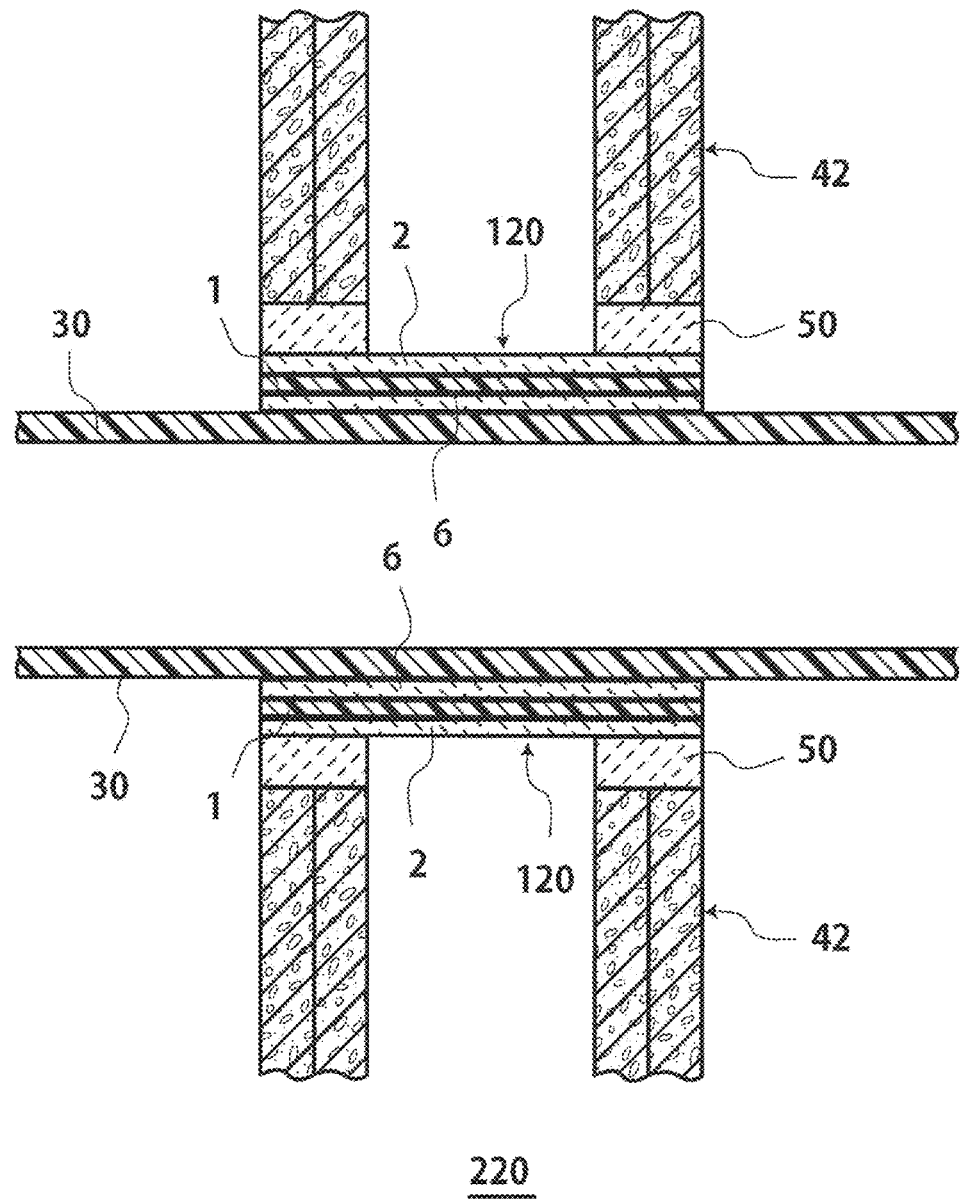
FIG. 16 is a schematic sectional view for explaining a penetration structure for a fireproof compartment according to the third embodiment.

FIG. 16 is a schematic sectional view for explaining a penetration structure for a fireproof compartment according to the third embodiment.

By filling the gap with the through hole 41 provided to the compartment 42 with an incombustible material 50, a penetration structure for a fireproof compartment 220 can be obtained.

Next, the epoxy resin-containing thermally expandable resin composition sheet 101 according to the fourth embodiment is explained.

The epoxy resin-containing thermally expandable resin composition sheet 101 according to the fourth embodiment is a modified example of the epoxy resin-containing thermally expandable resin composition sheet 100 according to the first embodiment.

Figure 17:
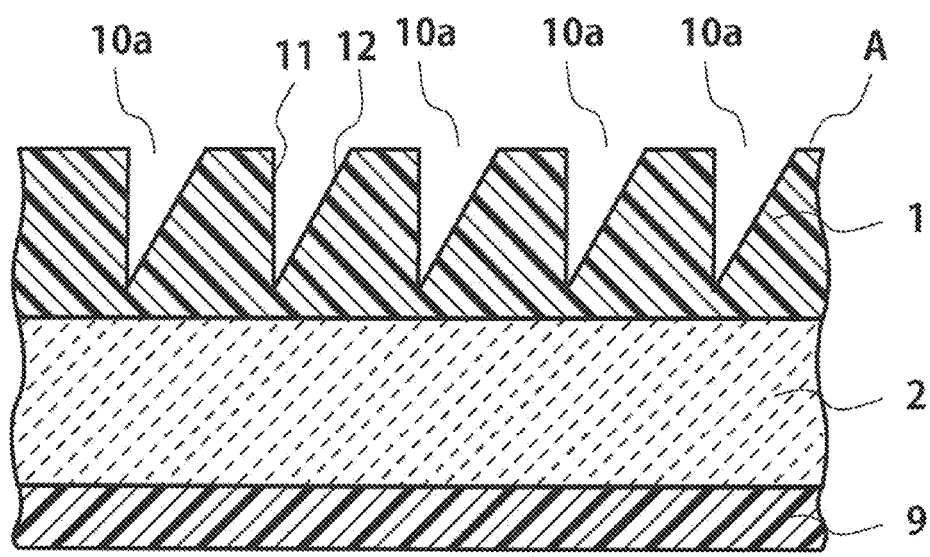
FIG. 17 is a schematic partial sectional view for explaining an epoxy resin-containing thermally expandable resin composition sheet according to the fourth embodiment.
Figure 18:
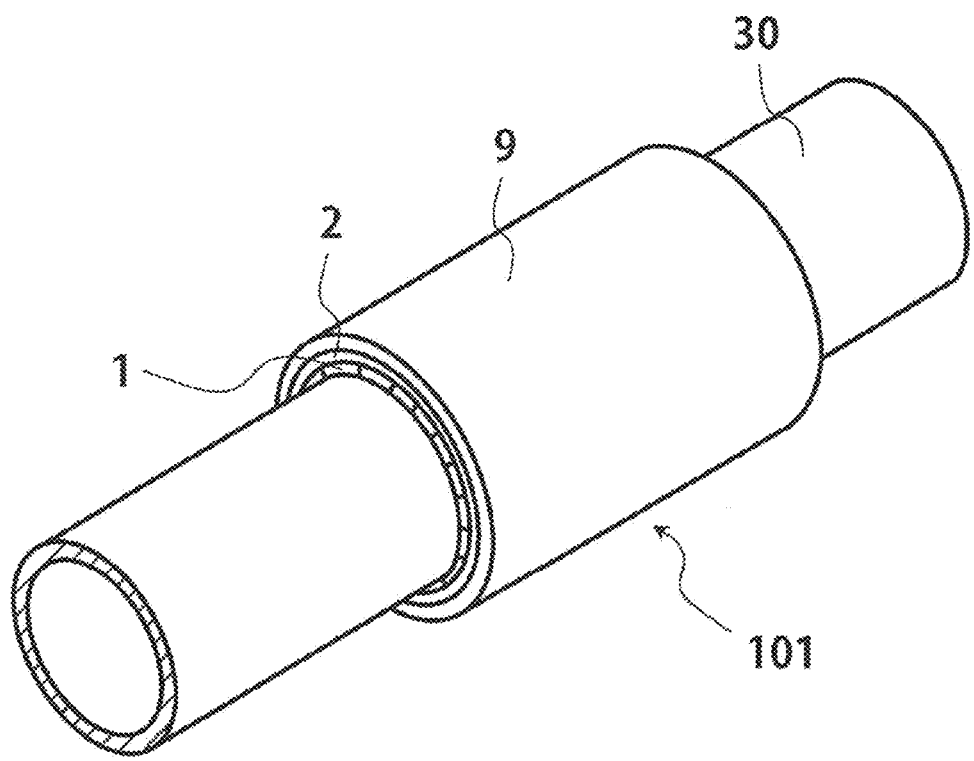
FIG. 18 is a schematic perspective view for explaining a state in which the epoxy resin-containing thermally expandable resin composition sheet is wound to the pipe.

FIG. 17 is a schematic partial sectional view for explaining an epoxy resin-containing thermally expandable resin composition sheet 101 according to the fourth embodiment, and FIG. 18 is a schematic perspective view for explaining a state in which the epoxy resin-containing thermally expandable resin composition sheet 101 is wound to the pipe 30.

When the epoxy resin-containing thermally expandable resin composition sheet 100 according to the first embodiment previously mentioned is to be bent, if it is bent by making the epoxy resin-containing thermally expandable resin composition layer 1 inside, it can be considered the possibility that the substrate layer 2 is broken depending on the degree of bending.

The epoxy resin-containing thermally expandable resin composition sheet 100 according to the first embodiment previously explained was a two-layer structure of the epoxy resin-containing thermally expandable resin composition layer 1 and the substrate layer 2.

To the contrary, the epoxy resin-containing thermally expandable resin composition sheet 101 according to the fourth embodiment is different therefrom in the point that the substrate layer 9 is laminated to the outside of the substrate layer 2.

In the cases of FIG. 17 and FIG. 18, an aluminum foil laminate glass cloth is used as the substrate layer 2, and a resin film is used as the substrate layer 9.

The raw material to be used for the resin film may be mentioned, for example, a polyolefin resin such as a polypropylene resin, a polyethylene resin, a poly(1-)butene resin, a polypentene resin, etc., a polystyrene resin, an acrylonitrile-butadiene-styrene resin, a polycarbonate resin, an acrylic resin, a polyamide resin, a polyvinyl chloride resin, a polyethylene terephthalate resin, a polybutylene terephthalate resin, a polyphenylene ether resin, a wholly aromatic polyester resin, a polyether sulfone resin, etc.

The resin film is preferably a general purpose resin film such as a polyethylene film, a polypropylene film, a polyethylene terephthalate film, etc., in the viewpoint of ease of use.

When the epoxy resin-containing thermally expandable resin composition sheet 101 is bent by making the linear grooves 10*a* of the epoxy resin-containing thermally expandable resin composition layer 1 contained in the previously mentioned epoxy resin-containing thermally expandable resin composition sheet 101 inside, even when the substrate layer 2 is broken, the substrate layer 2 is retained by the substrate layer 9. Therefore, the epoxy resin-containing thermally expandable resin composition sheet 101 according to the fourth embodiment can be used even when the substrate layer 2 is broken.

Figure 19:
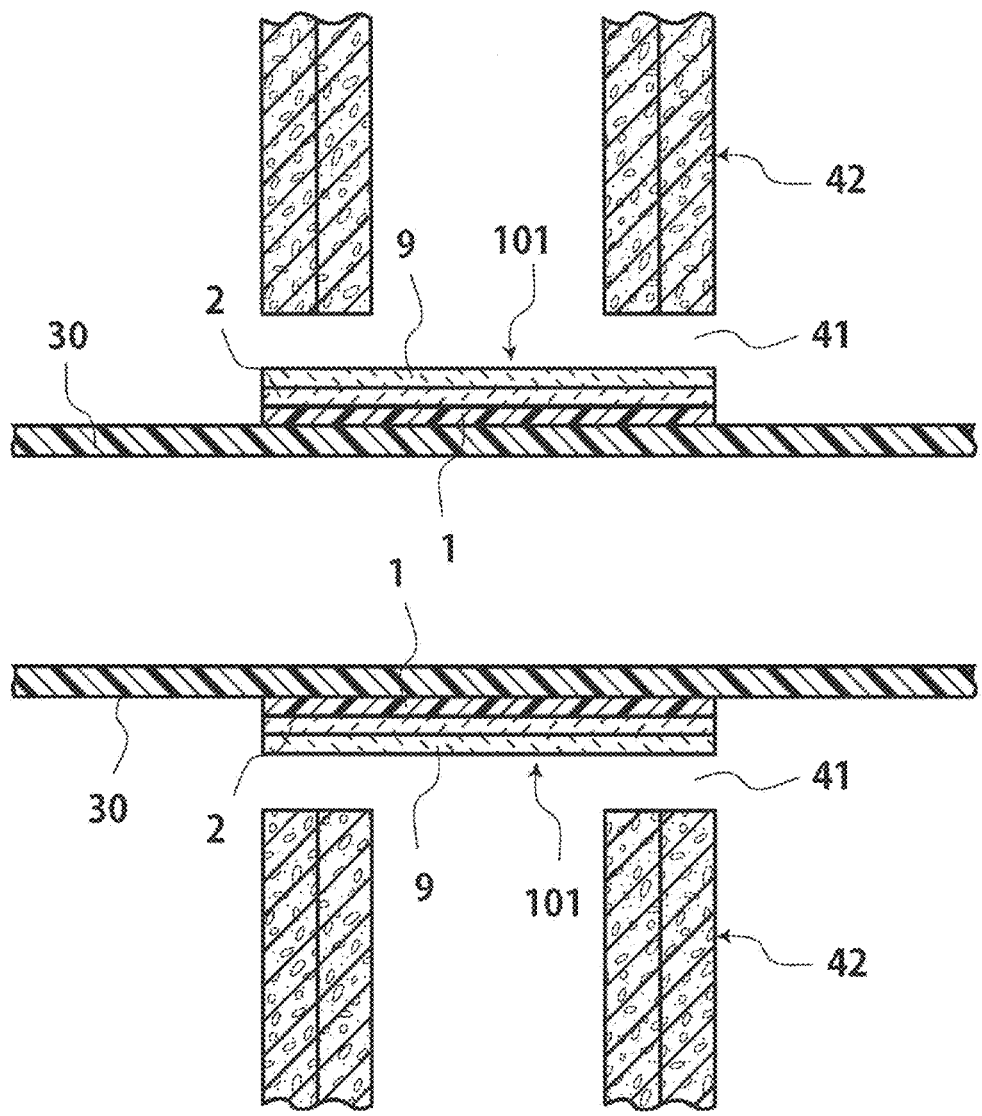
FIG. 19 is a schematic sectional view for explaining a method for constructing a penetration structure for a fireproof compartment using the epoxy resin-containing thermally expandable resin composition sheet according to the fourth embodiment.

FIG. 19 is a schematic sectional view for explaining a constructing method of the penetration structure for a fireproof compartment 230 using the epoxy resin-containing thermally expandable resin composition sheet 101 according to the fourth embodiment.

As illustrated in FIG. 19, the epoxy resin-containing thermally expandable resin composition sheet 101 is wound to the pipe 30 by making the linear grooves 10*a* of the epoxy resin-containing thermally expandable resin composition layer 1 contained in the epoxy resin-containing thermally expandable resin composition sheet 101 inside.

When the epoxy resin-containing thermally expandable resin composition sheet 101 is wound to the pipe 30, even if the substrate layer 2 is broken, the broken substrate layer 2 is retained by the substrate layer 9, so that the epoxy resin-containing thermally expandable resin composition sheet 101 can be maintained to a certain shape.

Figure 20:
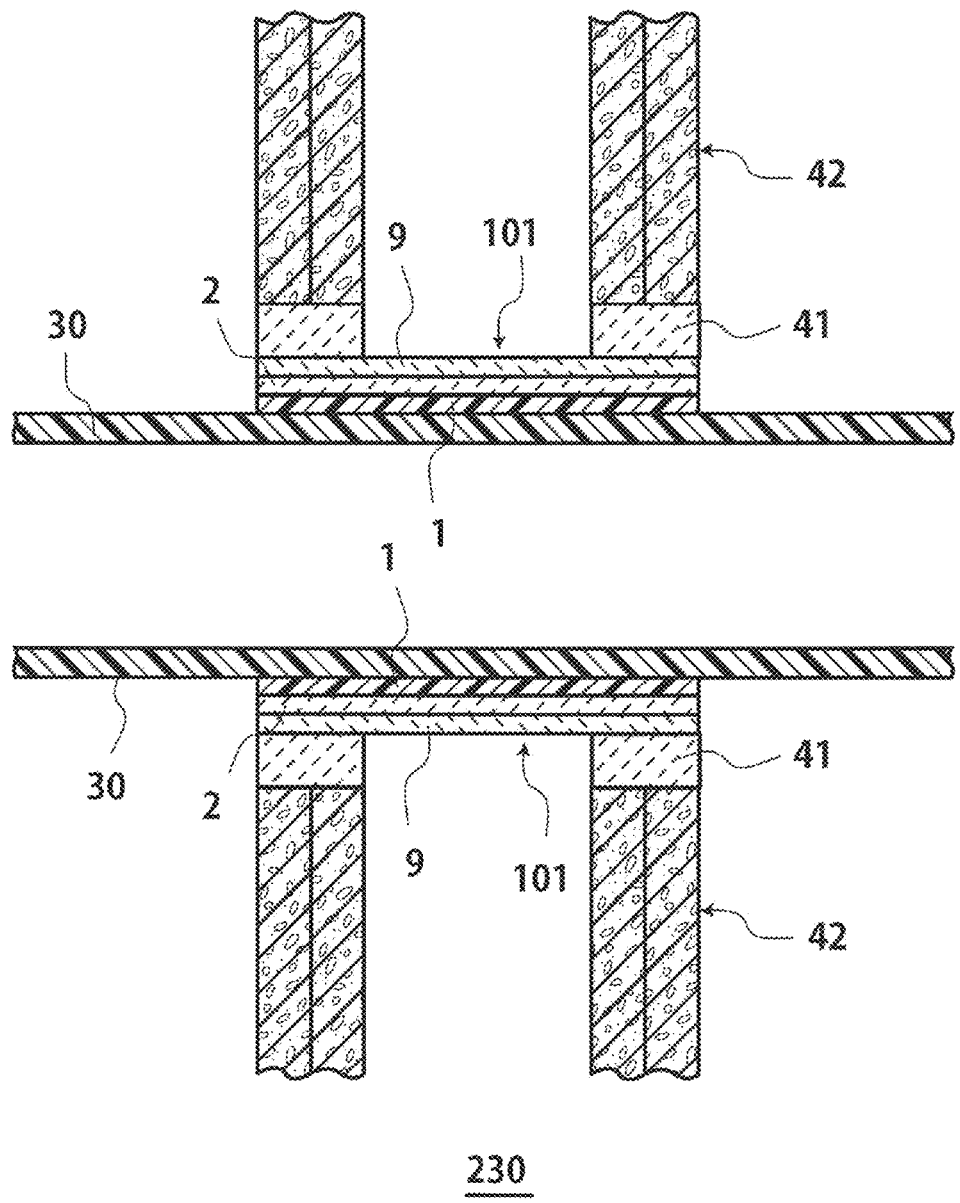
FIG. 20 is a schematic sectional view for explaining a penetration structure for a fireproof compartment according to the fourth embodiment.

FIG. 20 is a schematic sectional view for explaining a penetration structure for a fireproof compartment 230 according to the fourth embodiment.

By filling the gap with the through hole 41 provided to the compartment 42 with an incombustible material 50, a penetration structure for a fireproof compartment 230 can be obtained.

Next, the epoxy resin-containing thermally expandable resin composition sheet 130 according to the fifth embodiment is explained.

The epoxy resin-containing thermally expandable resin composition sheet 130 is a modified example of the epoxy resin-containing thermally expandable resin composition sheet 120 according to the third embodiment previously explained.

In the case of the epoxy resin-containing thermally expandable resin composition sheet 120 according to the third embodiment previously explained, an aluminum foil laminate glass cloth was used as the substrate layer 2, and nonwoven fabric was used as the substrate layer 6.

To the contrary, in the case of the epoxy resin-containing thermally expandable resin composition sheet 130, it is different therefrom in the points that nonwoven fabric is used as the substrate layer 2 and the substrate layer 6, and a substrate layer 9 consisting of a resin film is laminated at the outermost layer.

Figure 21:
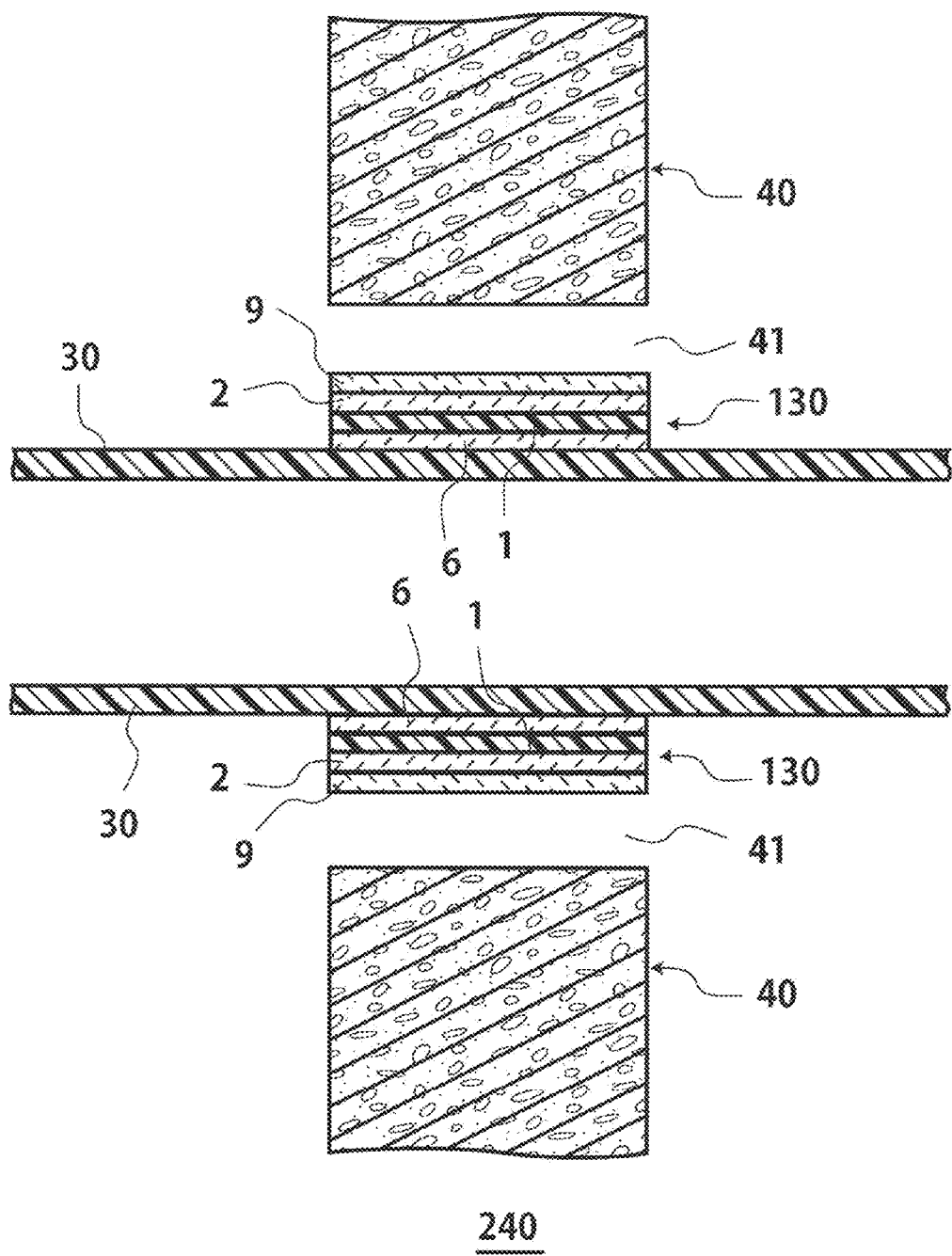
FIG. 21 is a schematic sectional view for explaining a method for constructing a penetration structure for a fireproof compartment using the epoxy resin-containing thermally expandable resin composition sheet according to the fifth embodiment.

FIG. 21 is a schematic sectional view for explaining a method for constructing a penetration structure for a fireproof compartment 240 using the epoxy resin-containing thermally expandable resin composition sheet 130 according to the fifth embodiment.

The epoxy resin-containing thermally expandable resin composition sheet 130 is wound to the pipe 30 by turning the linear grooves 10*c* (see FIG. 7) formed onto the epoxy resin-containing thermally expandable resin composition layer 1 contained in the epoxy resin-containing thermally expandable resin composition sheet 130 inside, i.e., toward the pipe 30 side.

When the epoxy resin-containing thermally expandable resin composition sheet 130 is wound to the pipe 30, the substrate layer 9 consisting of a resin film is provided at the outermost layer.

Since the substrate layer 9 consisting of the resin film is present, when the epoxy resin-containing thermally expandable resin composition sheet 130 is to be wound to the pipe 30, even if the substrate layer 2 is broken, the epoxy resin-containing thermally expandable resin composition sheet 130 can be prevented from scattering.

Figure 22:
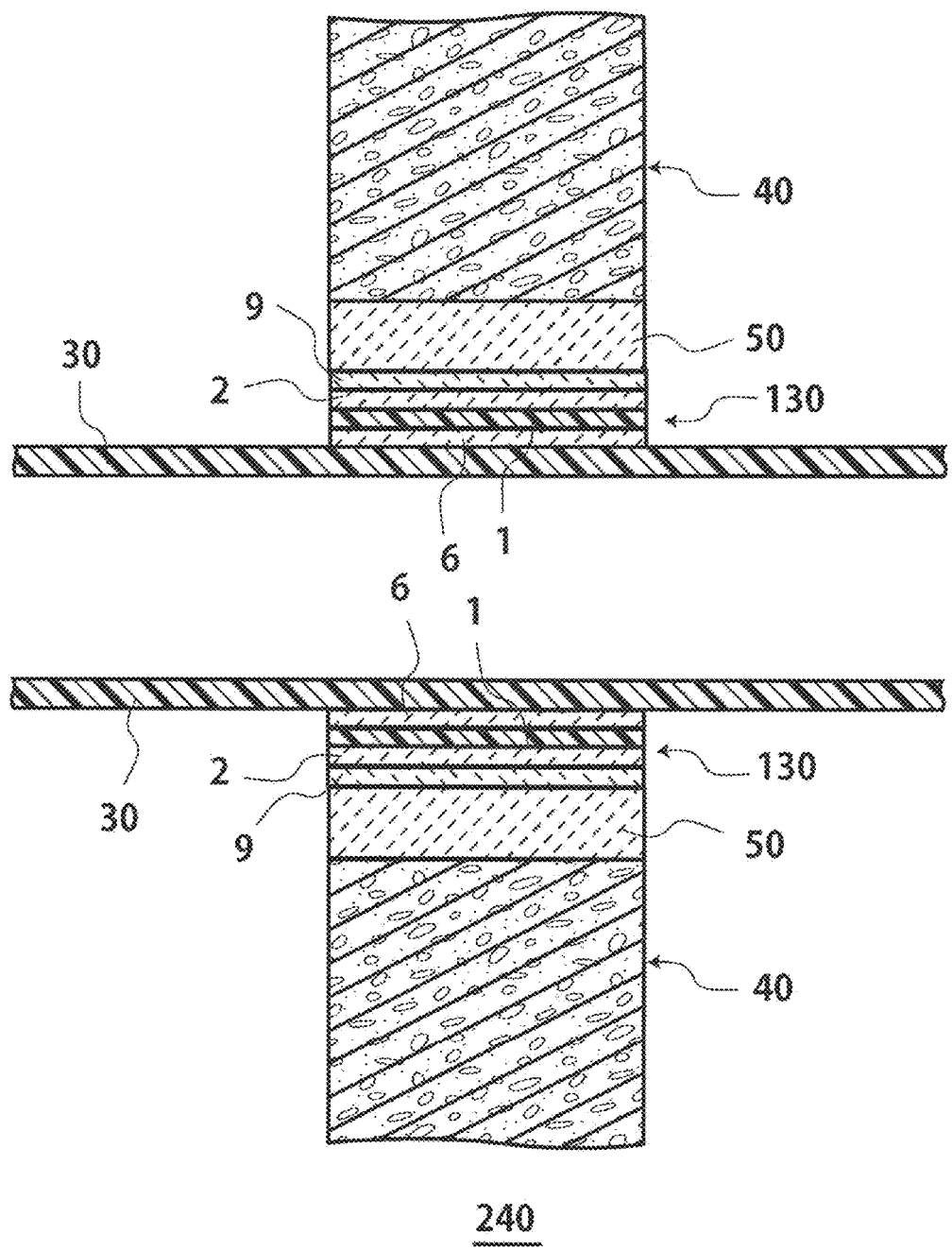
FIG. 22 is a schematic sectional view for explaining a penetration structure for a fireproof compartment according to the fifth embodiment.

FIG. 22 is a schematic sectional view for explaining a penetration structure for a fireproof compartment according to the fifth embodiment.

By filling the gap with the through hole 41 provided to the compartment 42 with an incombustible material 50, a penetration structure for a fireproof compartment 240 can be obtained.

Next, a modified example of a construction method of the penetration structure for a fireproof compartment 200 using the epoxy resin-containing thermally expandable resin composition sheet 100 according to the first embodiment is explained.

Figure 23:
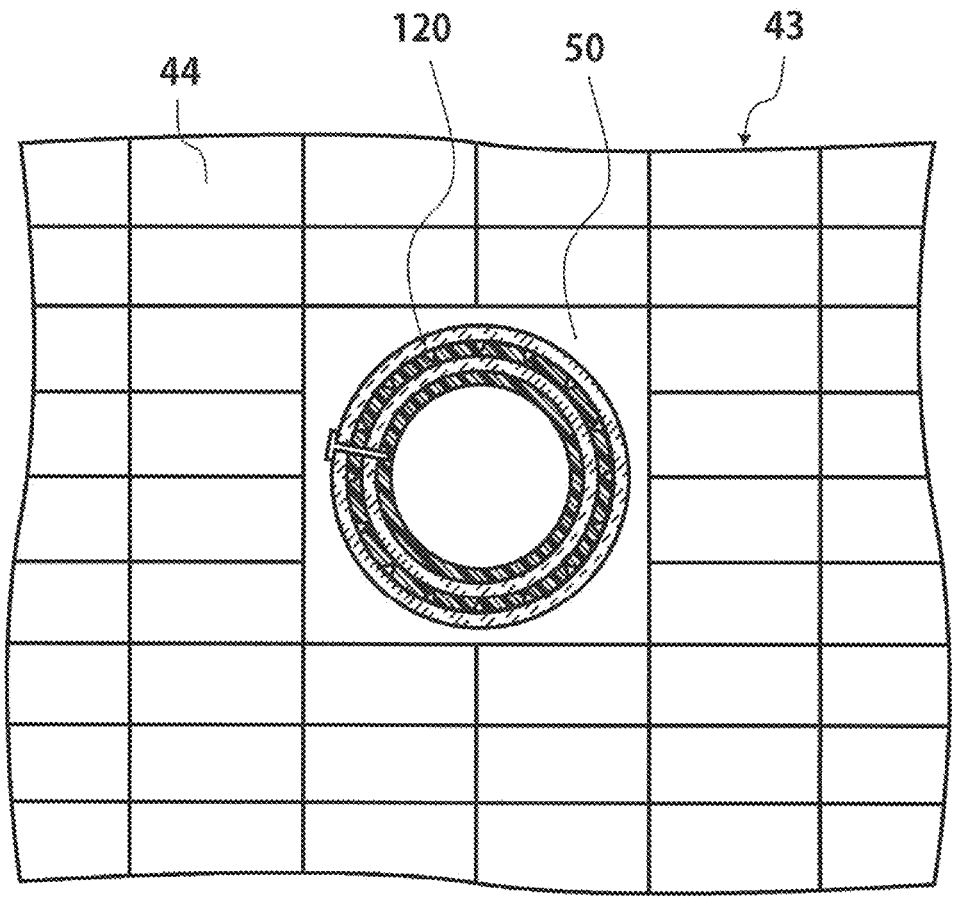
FIG. 23 is a schematic front view exemplifying a modified example of a penetration structure for a fireproof compartment using the epoxy resin-containing thermally expandable resin composition sheet.

FIG. 23 is a schematic front view exemplifying a modified example of a penetration structure for a fireproof compartment 200 using the epoxy resin-containing thermally expandable resin composition sheet 100.

In the previous penetration structure for a fireproof compartment 200, a wall was used as the compartment 40.

To the contrary, in the penetration structure for a fireproof compartment 250 shown in FIG. 23, it is different therefrom in the point that bricks are used as the compartment 44. Other than the above are the same as the previous penetration structure for a fireproof compartment 200.

As illustrated in FIG. 23, similarly to the previous construction method of the penetration structure for a fireproof compartment 200, the penetration structure for a fireproof compartment 250 can be conveniently constructed to the compartment formed by piling up bricks, concrete blocks, etc.

Next, the epoxy resin-containing thermally expandable resin composition sheet 140 according to the sixth embodiment is explained.

Figure 24:
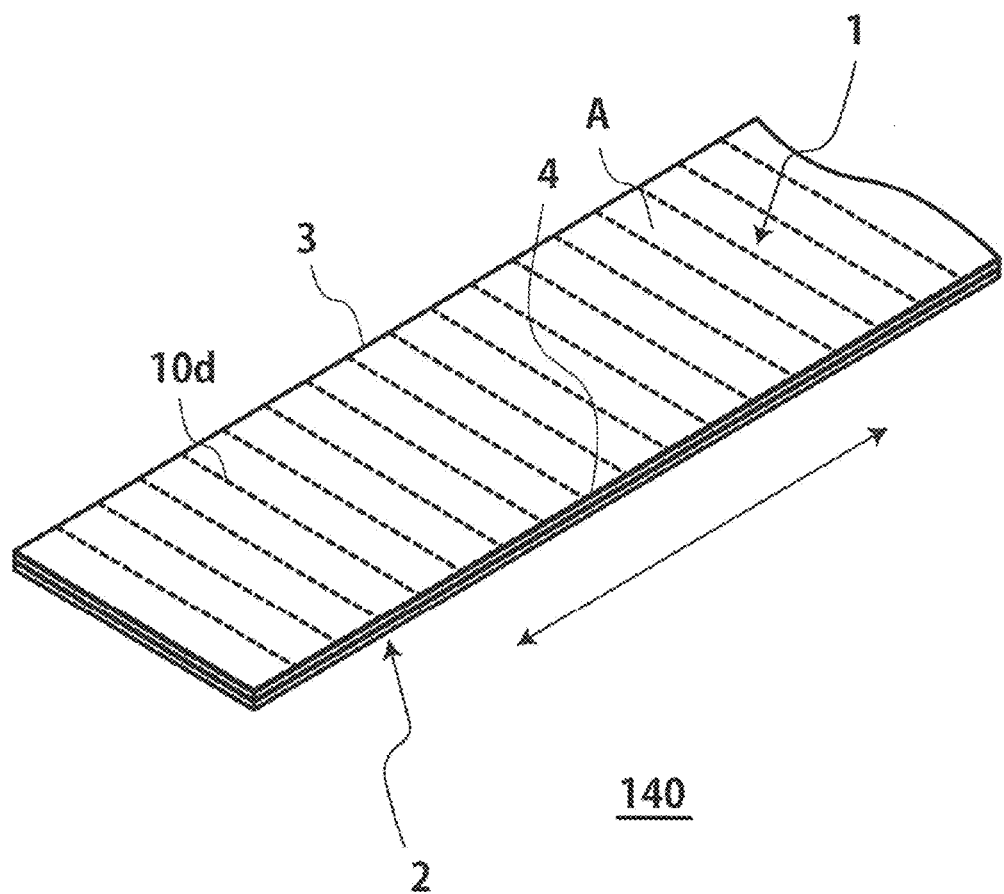
FIG. 24 is a schematic perspective view for explaining an epoxy resin-containing thermally expandable resin composition sheet according to the sixth embodiment.

FIG. 24 is a schematic perspective view for explaining an epoxy resin-containing thermally expandable resin composition sheet 140 according to the sixth embodiment.

The epoxy resin-containing thermally expandable resin composition sheet 140 according to the sixth embodiment is different in a shape of the linear grooves 10*d* formed onto the epoxy resin-containing thermally expandable resin composition layer 1 from the epoxy resin-containing thermally expandable resin composition sheet 100 according to the first embodiment. Other than the above are the same as in the case of the epoxy resin-containing thermally expandable resin composition sheet 100 according to the first embodiment.

As exemplified in FIG. 24, the epoxy resin-containing thermally expandable resin composition sheet 140 has dashed linear grooves 10*d*.

The linear grooves 10*d* of the epoxy resin-containing thermally expandable resin composition sheet 140 in the present invention are not necessarily be continuous so long as they can be cracked along with the linear grooves 10*d*, and may be an intermittent shape.

The epoxy resin-containing thermally expandable resin composition layer 1 of the epoxy resin-containing thermally expandable resin composition sheet 140 shown in FIG. 24 is bent to the direction to which the linear grooves 10*d* open, whereby it can be cracked along with the linear grooves 10*d*.

As a modified example of the epoxy resin-containing thermally expandable resin composition sheet 140, for example, the respective continuous linear grooves 10*b* and 10*c* of the previously explained epoxy resin-containing thermally expandable resin composition sheets 110 to 130 can be made intermittent linear grooves.

When the respective epoxy resin-containing thermally expandable resin composition sheets are used by cracking, the linear grooves may be continuous or intermittent.

To the contrary, if the epoxy resin-containing thermally expandable resin composition sheets are used without cracking, the linear grooves are preferably continuous since the epoxy resin-containing thermally expandable resin composition sheet can be easily bent.

Next, the epoxy resin-containing thermally expandable resin composition sheet 150 according to the seventh embodiment is explained.

The epoxy resin-containing thermally expandable resin composition sheet 150 according to the seventh embodiment is different in the point that the linear grooves 10*e* formed onto the epoxy resin-containing thermally expandable resin composition layer 1 are formed obliquely to the longitudinal direction of the epoxy resin-containing thermally expandable resin composition sheet 140 from the epoxy resin-containing thermally expandable resin composition sheet 100 according to the first embodiment. Other than the above are the same in the case of the epoxy resin-containing thermally expandable resin composition sheet 100 according to the first embodiment.

Figure 25:
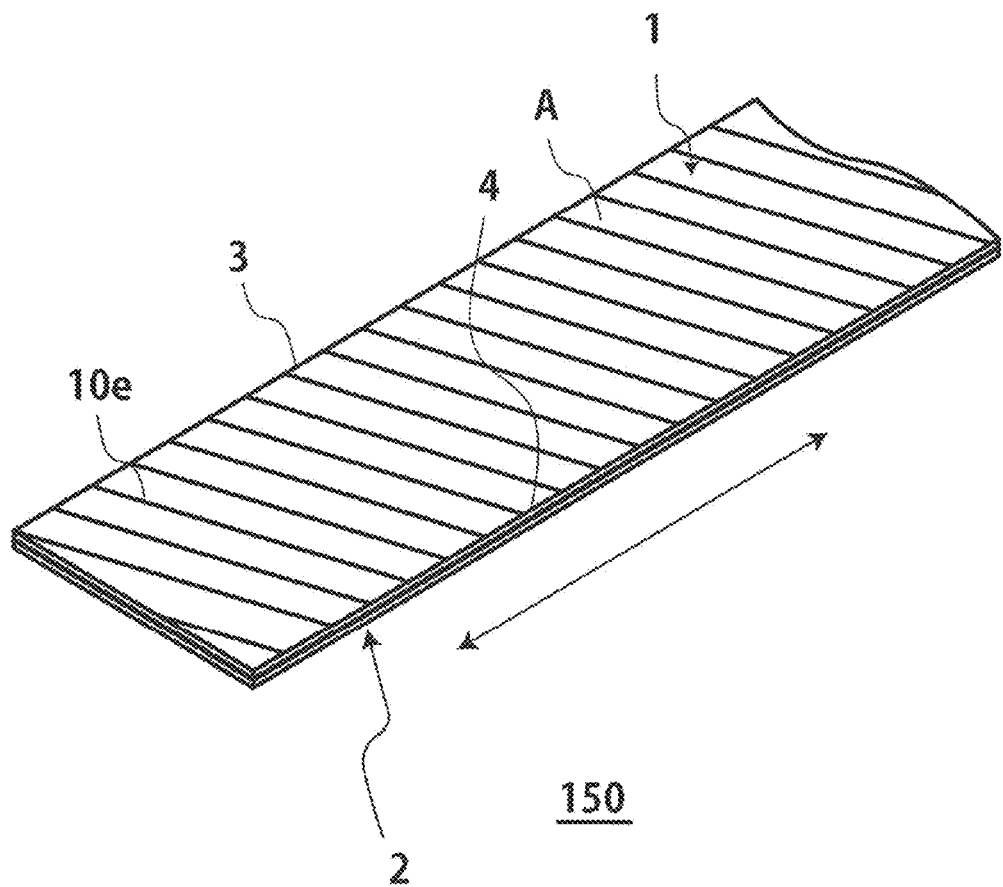
FIG. 25 is a schematic perspective view for explaining an epoxy resin-containing thermally expandable resin composition sheet according to the seventh embodiment.
Figure 26:
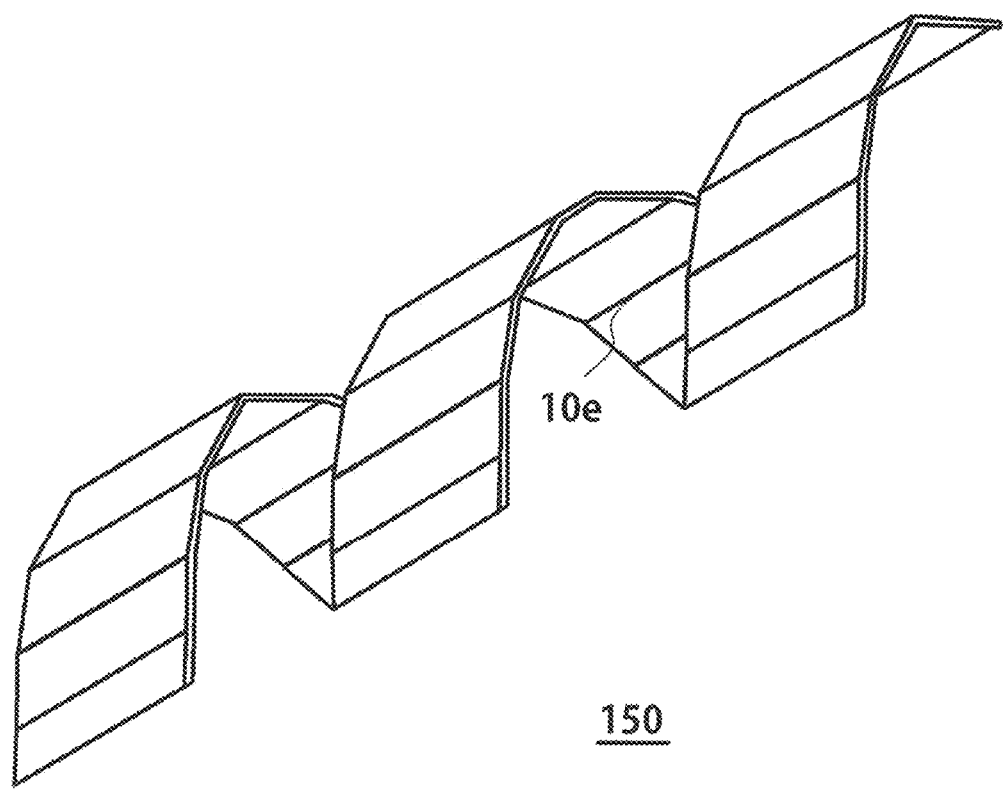
FIG. 26 is a schematic perspective view for explaining an epoxy resin-containing thermally expandable resin composition sheet according to the seventh embodiment.

FIG. 25 and FIG. 26 are each a schematic perspective view for explaining an epoxy resin-containing thermally expandable resin composition sheet 150 according to the seventh embodiment.

As exemplified in FIG. 25, in the epoxy resin-containing thermally expandable resin composition sheet 150, the linear grooves 10*e* formed onto the epoxy resin-containing thermally expandable resin composition layer 1 are obliquely formed to the longitudinal direction of the epoxy resin-containing thermally expandable resin composition sheet 150.

The epoxy resin-containing thermally expandable resin composition layer 1 of the epoxy resin-containing thermally expandable resin composition sheet 150 illustrated in FIG. 25 can be bent to the direction where the linear grooves 10*e* open or close, so that the epoxy resin-containing thermally expandable resin composition sheet 150 can be bent freely.

Also, since the linear grooves 10*e* are formed obliquely to the longitudinal direction of the epoxy resin-containing thermally expandable resin composition sheet 150, the epoxy resin-containing thermally expandable resin composition sheet 150 can be easily modified spirally.

By using the epoxy resin-containing thermally expandable resin composition sheet 150, the epoxy resin-containing thermally expandable resin composition sheet 150 can be easily and spirally wound to the outer periphery of the pipe 30.

A pitch of the spiral, etc., can be adjusted by an angle of the linear grooves 10*e*, a distance between the linear grooves 10*e*, etc., to be formed onto the epoxy resin-containing thermally expandable resin composition layer 1.

The linear grooves 10*e* preferably has an angle in the range of 10 to 85°, more preferably in the range of 30 to 85° to the longitudinal direction of the epoxy resin-containing thermally expandable resin composition sheet 150.

Next, the epoxy resin-containing thermally expandable resin composition sheet 160 according to the eighth embodiment is explained.

Figure 27:
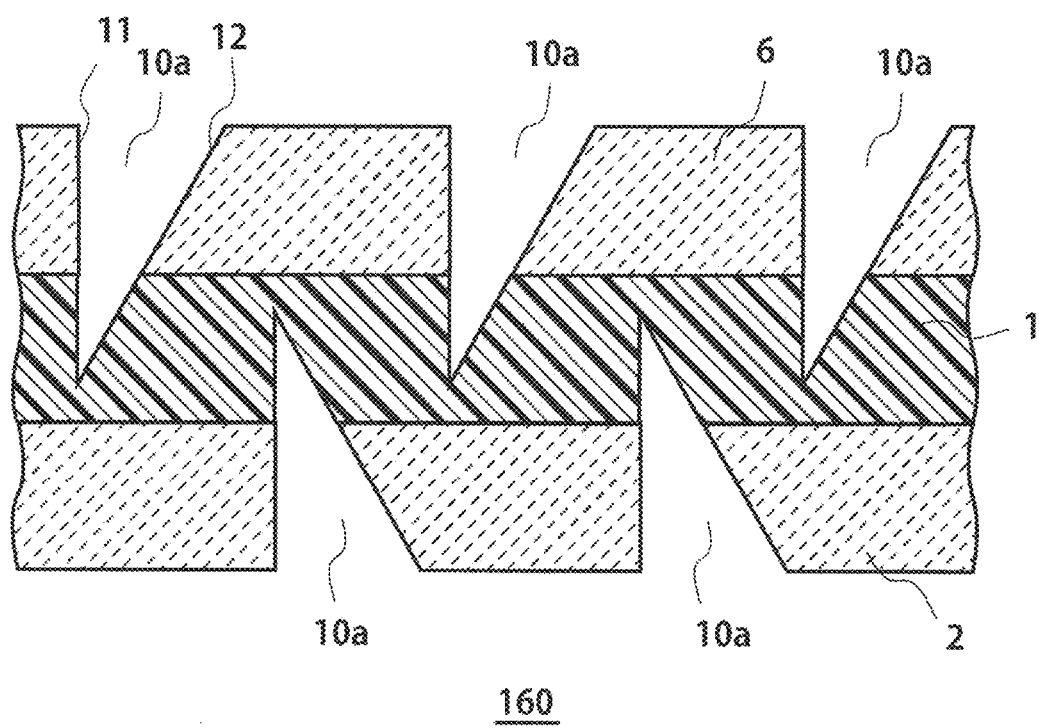
FIG. 27 is a schematic partial sectional view for explaining an epoxy resin-containing thermally expandable resin composition sheet according to the eighth embodiment.

FIG. 27 is a schematic partial sectional view for explaining an epoxy resin-containing thermally expandable resin composition sheet 160 according to the eighth embodiment.

The constitution of the epoxy resin-containing thermally expandable resin composition sheet 160 is the same as in the case of the epoxy resin-containing thermally expandable resin composition sheet 120 explained above.

In the case of the epoxy resin-containing thermally expandable resin composition sheet 120 explained above, linear grooves 10*c* were formed onto one surface of the epoxy resin-containing thermally expandable resin composition sheet 120.

To the contrary, in the case of the epoxy resin-containing thermally expandable resin composition sheet 160 according to the eighth embodiment, it is different therefrom in the point that linear grooves 10*a* are formed onto the both surfaces of the epoxy resin-containing thermally expandable resin composition sheet 160.

Figure 28:
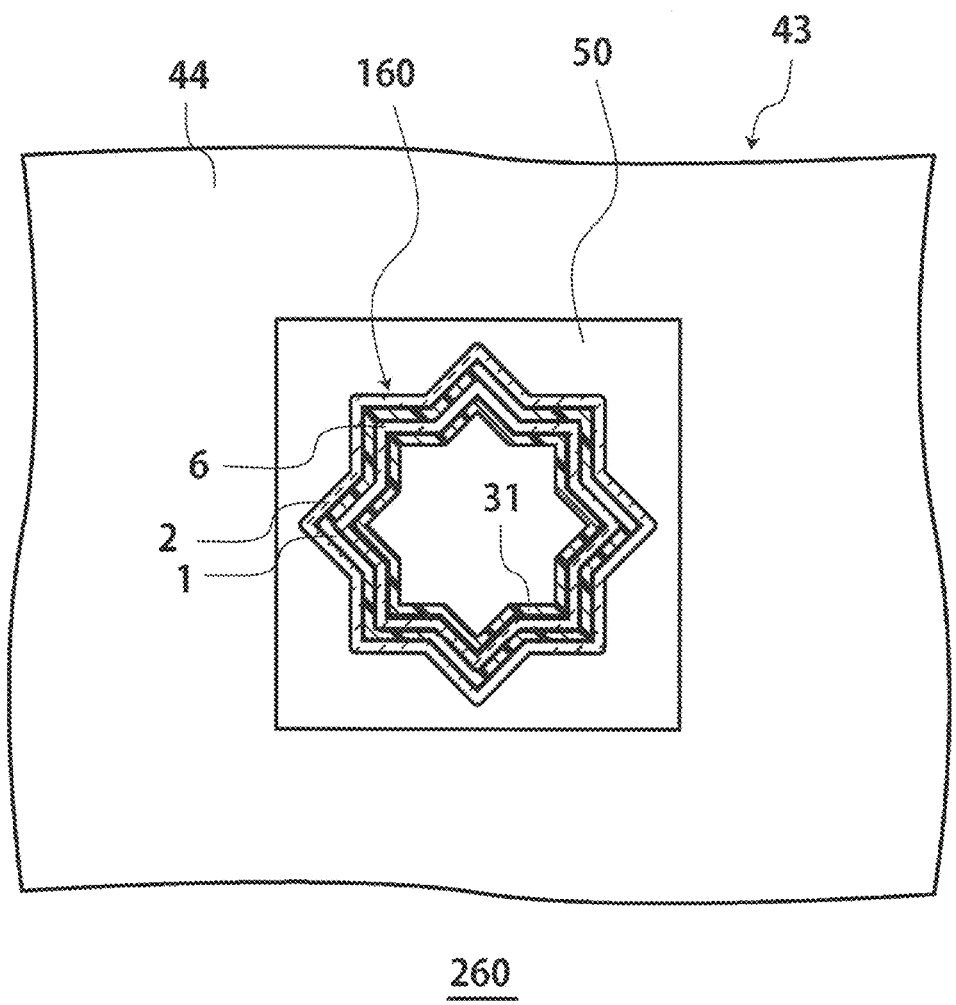
FIG. 28 is a schematic front view showing an example of construction of a penetration structure for a fireproof compartment using the epoxy resin-containing thermally expandable resin composition sheet according to the eighth embodiment.

FIG. 28 is a schematic front view showing an example of construction of the penetration structure for a fireproof compartment using the epoxy resin-containing thermally expandable resin composition sheet 160 according to the eighth embodiment.

The epoxy resin-containing thermally expandable resin composition sheet 160 has linear grooves 10*a* onto both surfaces, so that it can be bent freely as compared with the epoxy resin-containing thermally expandable resin composition sheet 120 in which linear grooves 10*c* are formed onto one surface thereof.

Therefore, when the epoxy resin-containing thermally expandable resin composition sheet 160 is used, even if outer shapes of the pipe 31 are complicated shapes, the penetration structure for a fireproof compartment 260 can be easily constructed as shown in FIG. 28.

Next, the epoxy resin-containing thermally expandable resin composition sheet 170 according to the ninth embodiment is explained.

Figure 29:
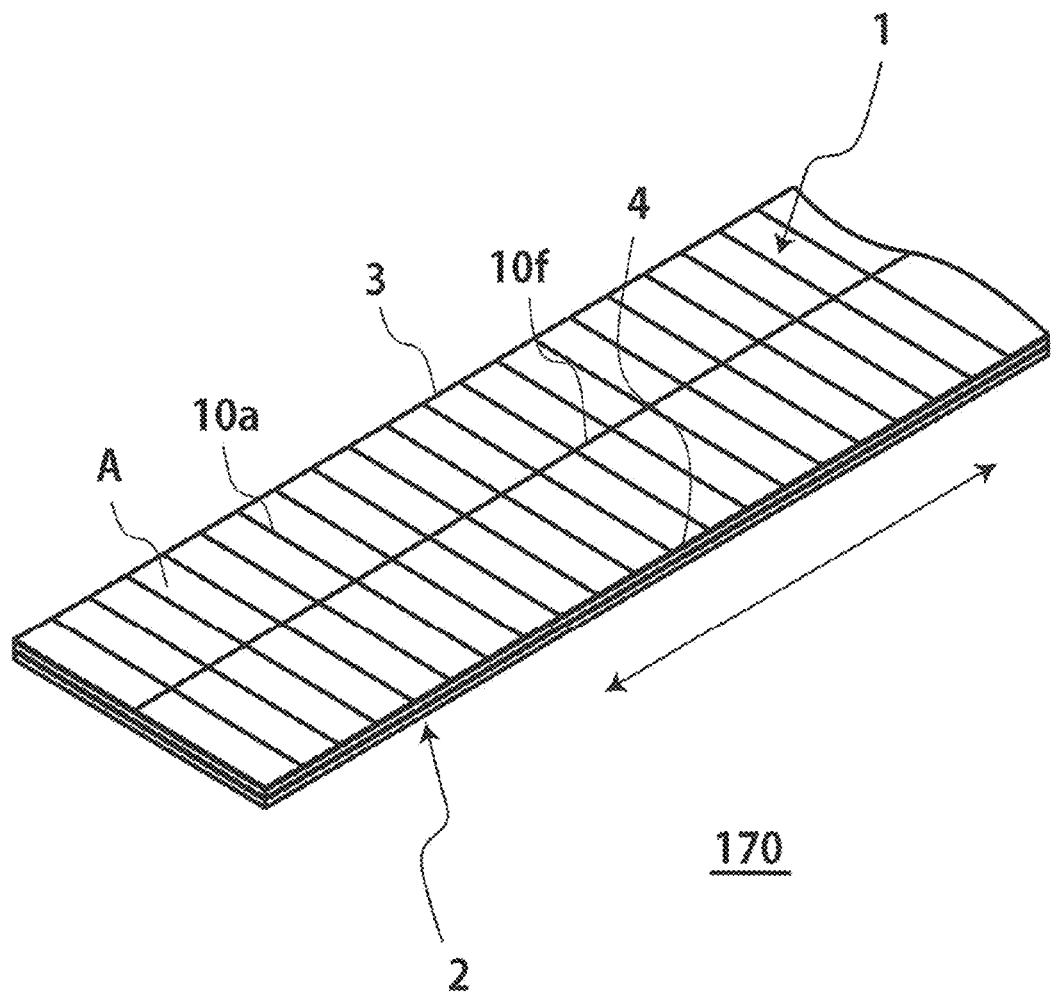
FIG. 29 is a schematic perspective view for explaining an epoxy resin-containing thermally expandable resin composition sheet according to the ninth embodiment.
Figure 30:
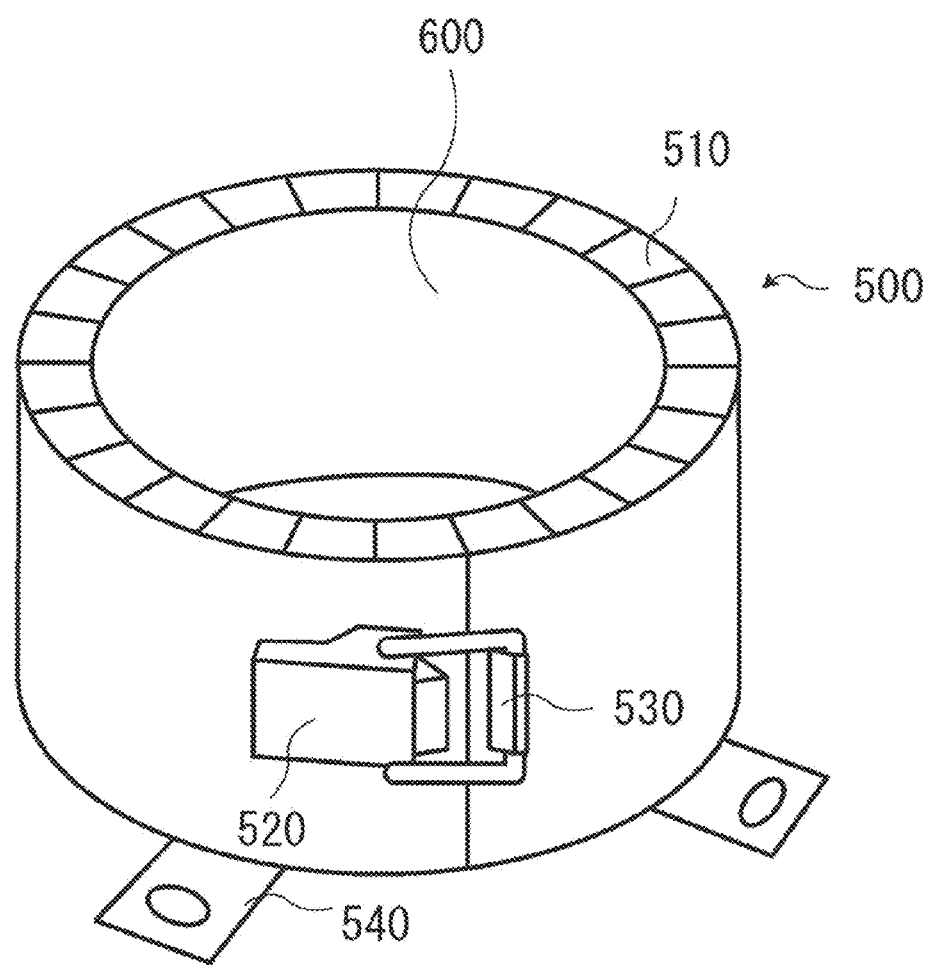
FIG. 30 is a schematic perspective view for explaining a conventional fireproof device.
Figure 31:
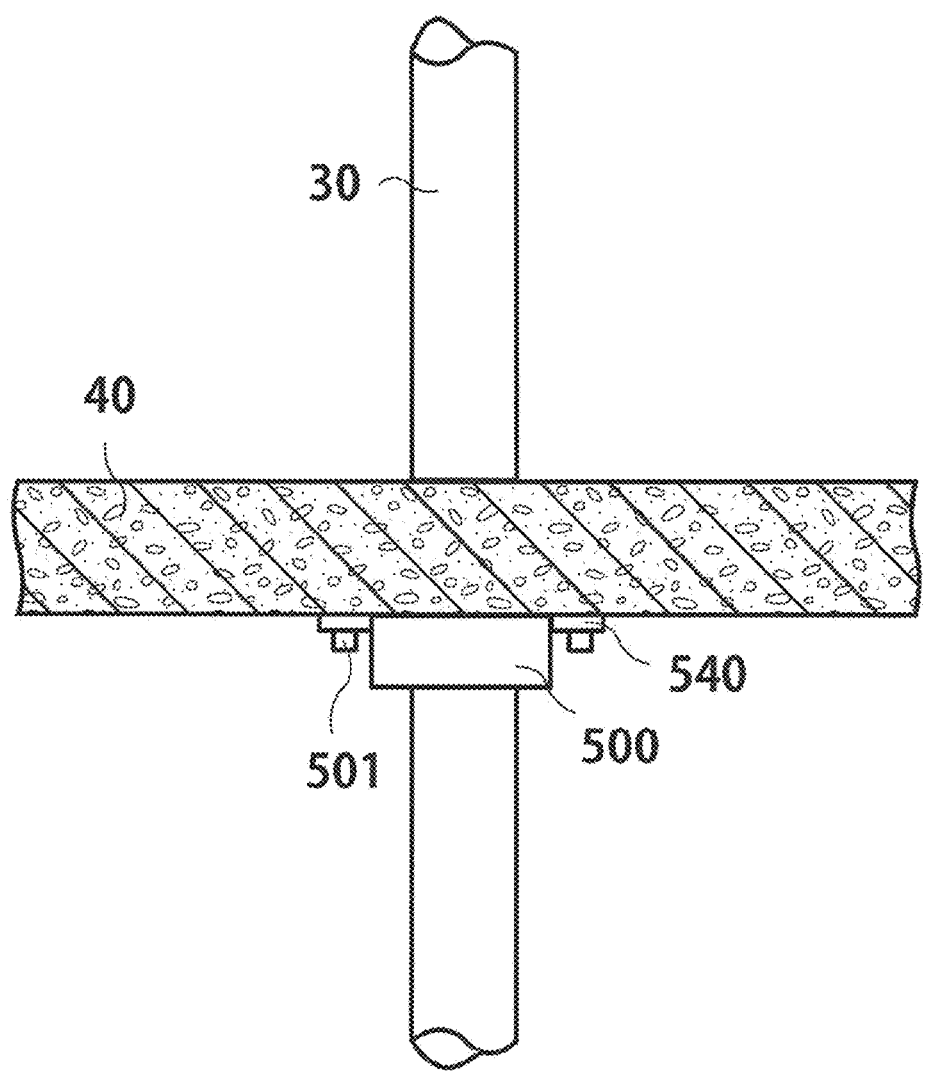
FIG. 31 is a schematic view for explaining a conventional penetration structure for a fireproof compartment using a collar.
Figure 32:
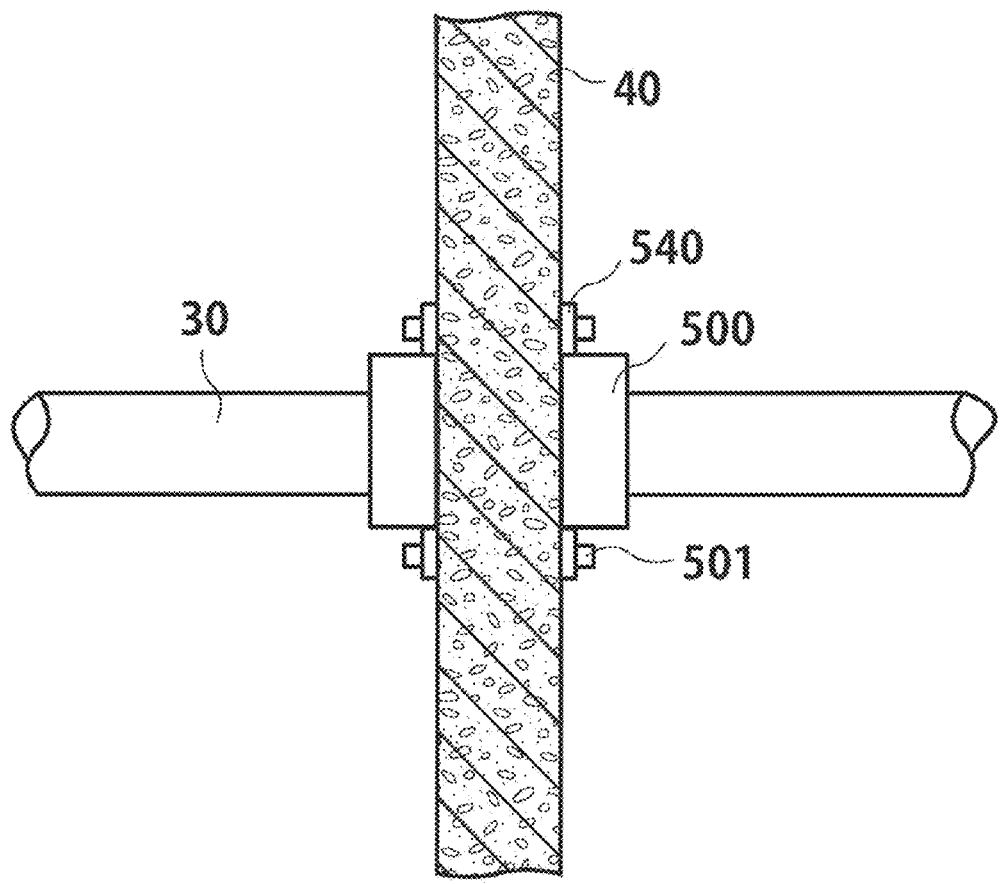
FIG. 32 is a schematic view for explaining a conventional penetration structure for a fireproof compartment using a collar.
Figure 33:
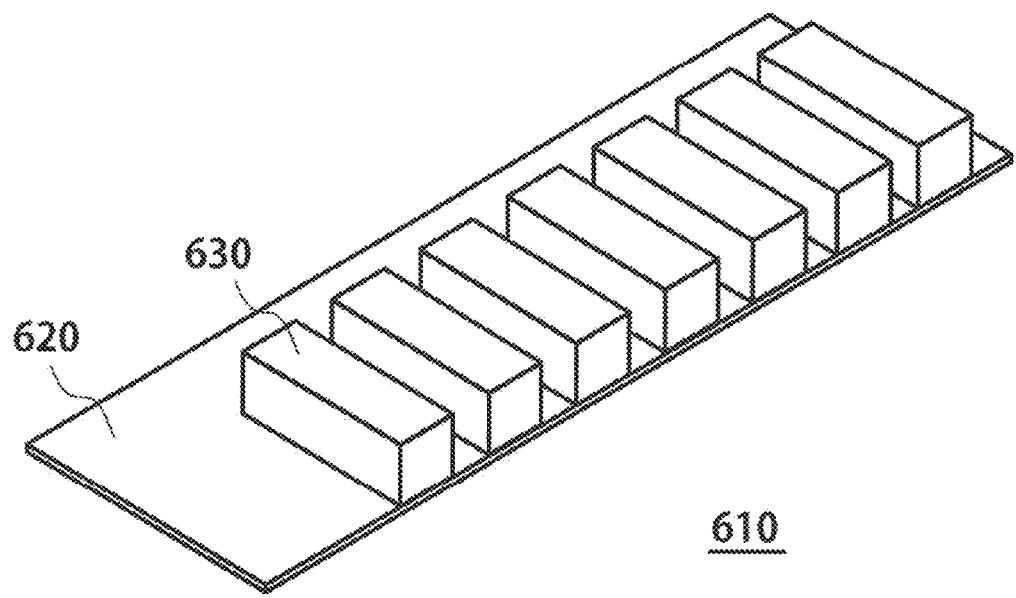
FIG. 33 is a schematic perspective view for explaining a structure of a conventional pipe collar.

FIG. 29 is a schematic perspective view for explaining an epoxy resin-containing thermally expandable resin composition sheet 170 according to the ninth embodiment.

The epoxy resin-containing thermally expandable resin composition sheet 170 is a modified example of the epoxy resin-containing thermally expandable resin composition sheet 100 explained above.

The epoxy resin-containing thermally expandable resin composition sheet 170 has, in addition to two or more linear grooves 10a, linear grooves 10f formed onto the longitudinal direction of the epoxy resin-containing thermally expandable resin composition sheet 170 which intersect with these linear grooves 10a.

The epoxy resin-containing thermally expandable resin composition sheet 170 can be cracked into two by utilizing the linear grooves 10f.

By providing the longitudinal direction of the epoxy resin-containing thermally expandable resin composition sheet 170 linear grooves 10f as mentioned above, the epoxy resin-containing thermally expandable resin composition sheet 170 can be used by dividing into a plural number of sheets, if necessary.

Next, the present invention is explained in more detail by referring to Examples, but the present invention is not limited by these Examples.

Example 1

The epoxy resin-containing thermally expandable resin composition sheet used in Example 1 is the same as the epoxy resin-containing thermally expandable resin composition sheet 110 according to the second embodiment explained in the aforementioned FIG. 3.

The epoxy resin-containing thermally expandable resin composition sheet 110 used in Example 1 were used Fi-Block (registered trademark; which comprises an epoxy resin, a thermally expandable black smoke, a phosphorus compound and an inorganic filler; commercially available from Sekisui Chemical Co., Ltd.) available from Sekisui Chemical Co., Ltd.

The Fi-Block is a material in which an epoxy resin-containing thermally expandable resin composition layer 1 and a substrate layer 2 have been laminated, and the substrate layer 2 is an aluminum foil laminated glass cloth. The Fi-Block (registered trademark) is a material in which an epoxy resin-containing thermally expandable resin composition layer 1, glass cloth and an aluminum foil have been laminated, respectively, in this order.

By using the epoxy resin-containing thermally expandable resin composition sheet 110 having a width of 130 mm and a length of 1000 mm, linear grooves 10b were formed onto the surface of the epoxy resin-containing thermally expandable resin composition layer 1 with an interval of 15 mm in parallel.

The linear grooves 10b were prepared by contacting a tip of a knife to the epoxy resin-containing thermally expandable resin composition layer 1 by using a hand and the knife was moved by the hand along with a ruler.

Next, the epoxy resin-containing thermally expandable resin composition sheet 110 was held in the hand, and when the Fi-Block was bent by the hand to the direction in which the linear grooves 10b open, the epoxy resin-containing thermally expandable resin composition layer 1 was cracked along with the linear grooves 10b as shown in FIG. 5 and FIG. 6.

Next, the epoxy resin-containing thermally expandable resin composition layer 1 of the Fi-Block was faced toward the outside, and the epoxy resin-containing thermally expandable resin composition sheet 110 was wound to the circumference of the pipe 30 made of a polyvinyl chloride, as illustrated in FIG. 13.

After the epoxy resin-containing thermally expandable resin composition sheet 110 was wound to the circumference of the pipe 30, the epoxy resin-containing thermally expandable resin composition sheet 110 was fixed to the circumference of the pipe 30 by using a commercially available adhesive tape.

Next, as illustrated in FIG. 14, the gap between the pipe 30 wound by the epoxy resin-containing thermally expandable resin composition sheet 110 and the through hole 41 provided to the compartment 40 was filled with an incombustible material 50 consisting of a mortar to obtain a penetration structure for a fireproof compartment 210.

On the other hand, by using the epoxy resin-containing thermally expandable resin composition layer 1 of the epoxy resin-containing thermally expandable resin composition sheet 110 used in Example 1, three-point bending test was carried out.

First, a test piece having a width of 20 mm, a length of 30 mm and a thickness of 2 mm was prepared, the test piece was mounted on a table which aparts 24 mm, and the center portion of the test piece was pressed from above with a rate of 5 mm/min to measure the resulting stress.

When a load was applied to the test piece at a temperature of 5° C., it caused brittle fracture with the load in the range of 250 to 350N, and the displacement in the range of 3 to 4.5 mm.

Also, an expansion ratio of the Fi-Block at 600° C. was 30.4-fold.

The Fi-Block was maintained at 600° C. for 20 minutes, and when the obtained expansion residue was vertically put up, the expansion residue retained the shape as it is.

Comparative Example

In place of the Fi-Block (Registered trademark, available from Sekisui Chemical Co., Ltd.) containing an epoxy resin used in Example 1, Fi-Block (Registered trademark, available from Sekisui Chemical Co., Ltd.) containing butyl rubber without containing an epoxy resin was used.

Completely the same operations as in Example 1 were carried out, but Fi-Block containing butyl rubber could not be cracked.

Also, an expansion ratio of the Fi-Block containing butyl rubber at 600° C. was 35.1-fold.

The Fi-Block was maintained at 600° C. for 20 minutes, and when the obtained expansion residue was vertically put up, the expansion residue could not retain the shape and collapsed.

Utilizable Field in Industry

The epoxy resin-containing thermally expandable resin composition sheet according to the present invention can be used easily even under a low temperature, so that it can be widely utilized as a material for the use of architecture, the use of ships, etc., which are required to have fire resistance at a cold district, etc.

EXPLANATION OF REFERENCE NUMERALS

1 Epoxy resin-containing thermally expandable resin composition layer 2, 6, 9 Substrate layer
3 One side of epoxy resin-containing thermally expandable resin composition layer
4 Other side of epoxy resin-containing thermally expandable resin composition layer
5 Epoxy resin-containing thermally expandable resin composition piece
7 Base tape
8 Pin
10a, 10b, 10c, 10d, 10e, 10f Linear grooves
11, 12 Side in linear grooves
30, 31 Pipes
40, 42, 44 Compartment
41 Through hole
50 Incombustible material
100, 101, 110, 120, 130, 140, 150, 160, 170 Epoxy resin-containing thermally expandable resin composition sheet
200, 210, 220, 230, 240, 250, 260 Penetration structure for fireproof compartment
500 Collar
501 Anchor bolt
510 Metal unit
520 Clasp
530 Receiver
540 Compartment fixing portion
600 Thermally expandable resin composition
610 Pipe collar
620 Aluminum foil
630 Block

The invention claimed is:

1. A penetration structure for a fireproof compartment which has a through hole(s) provided at a compartment and a pipe(s) penetrating through the through hole(s), wherein
a circumference of the pipe(s) is wound by an epoxy resin-containing thermally expandable resin composition sheet,
the epoxy resin-containing thermally expandable resin composition sheet comprises an epoxy resin-containing thermally expandable resin composition layer(s) having at least one of linear grooves continuously formed and linear grooves intermittently formed, and two or more of the respective linear grooves being formed onto at least one surface of the epoxy resin-containing thermally expandable resin composition sheet with an interval, and a substrate layer(s), being laminated,
the two or more respective linear grooves formed onto at least one surface of the epoxy resin-containing thermally expandable resin composition sheet are formed substantially perpendicular to the longitudinal direction of the epoxy resin-containing thermally expandable resin composition sheet, with an interval from each other,
the epoxy resin-containing thermally expandable resin composition sheet is wound to the pipe(s) toward the outside of the linear grooves continuously formed and linear grooves intermittently formed.

2. The penetration structure for a fireproof compartment described in the claim 1, wherein a gap between the pipe(s) wound by the epoxy resin-containing thermally expandable resin composition sheet and the through hole(s) provided at the compartment is filled with an incombustible material.

3. The penetration structure for a fireproof compartment described in the claim 2, wherein the compartment is a hollow wall.

4. A method for constructing a penetration structure for a fireproof compartment which comprises at least (1) a step of winding an epoxy resin-containing thermally expandable resin composition sheet to a pipe(s) penetrating through a through hole(s) provided at the compartment, and
(2) a step of filling a gap between the pipe(s) wound by the epoxy resin-containing thermally expandable resin composition sheet and the through hole(s) provided at the compartment by an incombustible material, wherein
the epoxy resin-containing thermally expandable resin composition sheet comprises an epoxy resin-containing thermally expandable resin composition layer(s) having at least one of linear grooves continuously formed and linear grooves intermittently formed, and two or more of the respective linear grooves being formed onto at least one surface of the epoxy resin-containing thermally expandable resin composition sheet with an interval, and a substrate layer(s), being laminated,
the two or more respective linear grooves formed onto at least one surface of the epoxy resin-containing thermally expandable resin composition sheet are formed substantially perpendicular to the longitudinal direction of the epoxy resin-containing thermally expandable resin composition sheet, with an interval from each other,
the step (1) is a step of bending the epoxy resin-containing thermally expandable resin composition layer of the epoxy resin-containing thermally expandable resin composition sheet to the direction in which the continuously or intermittently formed linear grooves open, and winding the epoxy resin-containing thermally expandable resin composition sheet to the pipe(s) penetrating through the through hole(s) provided to the compartment by facing the linear grooves toward the outside.

5. The method for constructing a penetration structure for a fireproof compartment described in the claim 4, which further comprises (3) a step of bending the epoxy resin-containing thermally expandable resin composition layer of the epoxy resin-containing thermally expandable resin composition sheet to the direction in which the linear grooves open, and cracking the same along with the linear grooves.

6. The method for constructing a penetration structure for a fireproof compartment described in the claim 4, which further comprises (4) a step of winding a base tape to the epoxy resin-containing thermally expandable resin composition sheet.

7. The method for constructing a penetration structure for a fireproof compartment described in the claim 4, wherein the compartment used in the step (2) is a hollow wall, and
at least one substrate layer laminated at the outside of the epoxy resin-containing thermally expandable resin composition layer contained in the epoxy resin-containing thermally expandable resin composition sheet contains an incombustible material.

8. The method for constructing a penetration structure for a fireproof compartment described in the claim 4, which comprises a step of winding a round or more the epoxy resin-containing thermally expandable resin composition sheet in which two or more respective linear grooves formed onto at least one surface of the epoxy resin-containing thermally expandable resin composition sheet are formed substantially perpendicular to the longitudinal direction of the epoxy resin-containing thermally expandable resin composition sheet with an interval from each other, in the substantially perpendicular direction to the longitudinal direction of the pipe(s).

9. The method for constructing a penetration structure for a fireproof compartment described in the claim 4, which comprises a step of winding spirally the epoxy resin-containing thermally expandable resin composition sheet in which two or more respective linear grooves formed onto at least one surface of the epoxy resin-containing thermally expandable resin composition sheet are formed obliquely to the longitudinal direction of the epoxy resin-containing thermally expandable resin composition sheet with an interval from each other, to the longitudinal direction of the pipe(s).

* * * * *